(12) United States Patent
Verba et al.

(10) Patent No.: US 6,236,977 B1
(45) Date of Patent: May 22, 2001

(54) COMPUTER IMPLEMENTED MARKETING SYSTEM

(75) Inventors: Stephen M. Verba, Kirtland; Anthony M. Ciepiel, Hudon, both of OH (US)

(73) Assignee: Realty One, Inc., Cleveland, OH (US)

( * ) Notice: Subject to any disclaimer, the term of this patent is extended or adjusted under 35 U.S.C. 154(b) by 0 days.

(21) Appl. No.: 09/225,283

(22) Filed: Jan. 4, 1999

(51) Int. Cl.[7] .................................................. G06F 17/60
(52) U.S. Cl. ............................ 705/10; 705/14; 705/26; 705/27; 705/37
(58) Field of Search .............................. 705/37, 10, 14, 705/26, 27, 44; 706/925

(56) References Cited

U.S. PATENT DOCUMENTS

| | | | |
|---|---|---|---|
| 5,214,745 | 5/1993 | Sutherland | 395/22 |
| 5,515,477 | 5/1996 | Sutherland | 395/27 |
| 5,930,764 | * 7/1999 | Melchione et al. | 705/10 |
| 5,970,064 | * 10/1999 | Clark et al. | 370/351 |

FOREIGN PATENT DOCUMENTS

261046 * 3/1988 (EP).

OTHER PUBLICATIONS

News Digest, Webtrack, pp. 1–5, Dec. 1997.*
Jan Samzelius, Computerworld, pp. 1, Feb. 1996.*
Cochran Thomas N, Offerings in the offering: Catalog couture, pp. 1–3, Feb. 1997.*
survey of Buying Power, Sales and Marketing Management, pp. 1–5, Aug. 1991.*
DataMind Adds WebPoint to Marketon, pp. 1–2, Jul. 1998.*
Lackner, Dan, One–to–One Marketing: Maximizing database marketing with customer intelligence, pp. 1–4, Feb. 1998.*
Berger Melanie, Sales and Marketing Management, pp. 1–3, Sep. 1997.*
Starnes, Clarke et al, Aggressive rick management of HELOC portfolios pp. 1–5, Jul. 1998.*

* cited by examiner

*Primary Examiner*—James P. Trammell
*Assistant Examiner*—Mussie Tesfamariam
(74) *Attorney, Agent, or Firm*—Harness, Dickey & Pierce, P.L.C.

(57) ABSTRACT

A state-event engine manages behavior over time in response to events in deterministic fashion from user-supplied rules and policies for a set of dynamic objects. The campaign engine selectively generates and stores a campaign population, representing different types of marketing campaigns. A collection of dynamic object data stores maintains data on the corresponding marketing agent population, resource population, and listing population. A matching process orders members of the listing populations based on the target of at least two members of the campaign population such that a set of offers to buy and offers to sell the same resources is created. A prediction engines processes historical data to predict how campaigns can best match buyer to seller. Software agents negotiate on behalf of buyer and seller identify potential deals. The system is capable of being implemented using computer network and web-based technology.

53 Claims, 18 Drawing Sheets

COMPUTER IMPLEMENTED MARKETING SYSTEM

BACKGROUND AND SUMMARY OF THE INVENTION

The present invention relates generally to computerized business management systems. More particularly, the invention relates to an electronic commerce marketing system that automates and optimizes the behavior of inbound and outbound marketing campaigns on behalf of each of several different parties seeking to exchange valuable resources. The optimization takes places over time as the system learns from previous results allowing such campaigns to tune themselves. In one embodiment, the computer-implemented system employs an optimization engine utilizing genetic algorithmic and game theory techniques augmented by a prediction engine that uses holographic neural network techniques. Although the system is well adapted and described in the context of a single family residential real estate marketing system, it may be readily adapted to for use in other businesses, as well.

The real estate industry has traditionally relied heavily on social contact (word of mouth) and comparatively simple advertising campaigns, all relying heavily on the interpersonal skills of the real estate company's agents. Although computer technology has been used to automate the collection and distribution of real estate multiple listing information, very little else has been done to improve the information infrastructure of the real estate business as a whole. Other industries, primarily those involved in direct business-to-business marketing, have begun to use computer systems to automate the marketing process. However, existing marketing computer systems have been designed to facilitate complex, multi-person sales activity between manufacturers and their customers and do not work very well in consumer markets such as the real estate market. On the other hand, current consumer marketing systems such as contact management systems, telemarketing systems, and mail order processing systems do not begin to address the more sophisticated aspects of real estate marketing. In any event, current business-to-business marketing systems and consumer marketing systems all suffer from similar common weaknesses: they either present no means for improving efficiency over time, or they place the burden of improvement on user-supplied rules which require trial-and-error experiments and separate ad hoc analysis of the results of those experiments.

To illustrate, consider some of the issues faced by the residential single family home real estate brokerage firm. First, for most people, the home is the most substantial asset they will ever own. The decision to buy or sell a home is an emotional one and many people will understandably take a long time to mentally commit that they are ready to buy or sell. Then, even if their home buying or selling readiness is high, there is the issue of locating a suitable property, obtaining financing, finding a buyer for a person's existing property, and so forth. All of these emotionally fraught uncertainties make the real estate business highly labor intensive. It has heretofore been very costly and inefficient to locate ready buyers and sellers using conventional mailing lists and telemarketing campaigns. Simply stated, there has heretofore been no way to predict which members of the potential customer population represent good leads on which to follow up.

As noted, real estate brokerage companies have traditionally relied heavily on their real estate agents to meet the potential customer population face to face, to identify the best buyer and seller candidates. This presents a significant problem for brokerage firms that are trying to increase market share while protecting profit margins. In this labor-intensive industry, increasing market share has traditionally required increasing the number of agents. Increasing the number of agents does not translate to increased productivity and efficiency since after a point the best agents have already been taken; in fact, increasing the number of agents can actually reduce efficiency. What is needed is a means to increase the overall efficiency of the entire marketing process for the broker, the agents and the public.

The present invention applies a highly sophisticated, computer-implemented system to this consumer marketing problem. Used properly over time, the computer-implemented system can re-engineer much of the marketing side of the business. Although the presently preferred embodiment is adapted to the residential single family home aspect of the real estate marketing business, the system described herein can readily be adapted to other types of businesses, particularly those involved in consumer marketing with a sales force.

According to one aspect of the invention, a computer-implemented, self-optimizing marketing system is provided. A campaign engine selectively generates and stores a campaign population, that is, a plurality of individual marketing campaigns, each campaign characterized by a plurality of campaign attributes. Campaigns can be created on behalf of a broker (e.g. via a broker employee), a member of the public (e.g. actual or potential buyers and sellers of properties) or agents (i.e. real estate sales associates). Campaigns perform useful work on behalf of the sponsor, typically oriented to fulfilling desires to utilize, incorporate, exchange, access or monopolize resources in a more automated and efficient way than would be possible for the sponsor to do otherwise. By way of example, the campaign population might include inbound campaigns that manage the leads generated by members of the public calling a broker's hotline to learn about properties for sale in that market. The campaign population might also include outbound campaigns to manage the process of finding the optimum candidates to receive direct mail about a property or seminar. Each of the specific campaigns in the campaign population is differentiated from other campaigns by their respective campaign attributes. The system also includes a data structure for the storage and retrieval of various campaign data including; the campaign's sponsor, the desires of that sponsor in terms of specific resources, and rules or constraints (e.g. time, money) on how to optimally meet those desires. The marketing systems provides for a feedback loop between outbound campaigns and inbound campaigns such that the results of inbound campaigns can be used to monitor and improve the effectiveness of outbound campaigns.

The marketing system further includes a data store for storing a person population, property population, agent population and a broker population. Such populations may include both actual and potential members (i.e. actual customers and potential customers in the person population, actual agents and potential agents in the agent population, etc. The person population consists of individual members, each comprising stored data that represents a plurality of current customers, past customers and non-customers adding up to all members of a market's total adult population. The members of the person population are each characterized by a plurality of person attributes. In the presently preferred embodiment, the person attributes would include suitable identifying information, allowing those members of the person population to be contacted. In the preferred embodiment, the person attributes also include quantitative attributes that indicate each (non-customer) member's readiness to enter the market and the desires of that member regarding properties on the market, currently or in the future. Similarly, the agent population consists of individual members, each comprising a plurality of agents or potential agents who themselves are characterized by a plurality of agent attributes, including actual or predicted quantitative attributes regarding an agents sales productivity, areas of specialization and market areas served. The property population for a particular market is fully represented in the data store with plurality of actual properties and potential properties (e.g. sub-developments with unsold lots, etc). The property attribute data includes previous sales history, current sales status (from multiple listing service data, summary and detail of accumulated inquiries by potential customers regarding the property and (for properties not yet up for sale) calculated probability of that property coming into the market soon, as well as predicted days-on-market. The broker population consists of one or more brokers whose attribute data include compensation plans for agents, available services, fees and costs for those services, sets of roles for employees, defined trading areas and various marketing assets.

The marketing system further includes an optimization engine that accesses campaign data, person data, property data, agent data and broker data. The optimization engine utilizes a scoring process for ordering the members of a particular population. The scoring process employs an adaptive scoring algorithm that alters the scores based upon relations among at least some of the campaign attributes and person, property, broker, or agent population member attributes. Scores are used to compete for scarce resources by way of an exchange process that itself comprises an optimization engine. This competition creates the desired optimization for the campaign. By way of example, members of the public who call the broker's hotline are treated by the inbound hotline campaign as potential lead. These potential leads enter the exchange process with particular scores that are used to allow those potential leads to compete for slots in the following day's call queue for outbound telemarketing. A formal bidding process takes place whereby the call queue slots bid for the best leads using rules specified to the governing inbound and outbound campaigns by the user. In addition, the campaign includes a set of policies that ensures that the overall call queue is also optimized to a desired level not just individual slots (that is, the total set of filled slots in the call queue meets some objective function as well as the individual slots). Leads that do not make it for that day's call queue are recycled into the next day's competition by being allowed to re-enter the next day's exchange process. In this way, the optimization engine continuously tunes itself to better achieve the desired goals of the appropriate inbound and outbound marketing system campaigns.

The marketing system also includes a prediction engine that accesses the data structures to issue predictions based on historical data. The prediction engine can be used to complement the key values generated from user-specified rules. Continuing with the example begun in the previous paragraph, leads obtained via an inbound hotline campaign are assigned a home buying or selling readiness state using rules specified in the campaign by the user. The prediction engine also issues its own predicted home buying or selling Readiness State for each lead. As more and more historical data is developed, the predicted states become more accurate than the ones generated by the user's rules. The exchange process begins to weigh the predicted states as more important than the user-specified, rule-generated states. The system provides for additional tuning of marketing campaigns in ways that extend beyond the initial rules provided by users. Thus, campaigns actually evolve and become more effectiveness over time.

In another aspect of the invention, the computer-implemented real estate marketing system facilitates commerce between real estate agents, members of the public and one or more real estate brokers. The system includes a campaign engine for selectively generating a plurality of marketing campaigns characterized by a plurality of stored campaign attributes. The campaign engine has several interfaces by which different users may interact with the system and by which different kinds of information can be input to and read from the system. These interfaces include an agent interface by which real estate agents may specify rules to be reflected in at least one marketing campaign, and by which real estate agents may receive leads representing selected members of the public. The system also includes a broker interface by which a real estate broker may specify rules to be reflected in at least one marketing campaign and by which selected ones of the stored campaign attributes may be communicated to the broker. Finally, the system includes a public interface whereby potential or existing customers may create campaigns to manage services to meet their needs to buy or sell properties and obtain agents to represent them in these transactions. The same system unites and optimizes the needs of all three classes of participants via the campaign engine, the optimization engine and the prediction engine. The broker can create campaigns that interact with agents or members of the public or other brokers. Agents can create campaigns to interact with other agents or the public or one or more brokers. Members of the public can create campaigns to interact with each other or agents or brokers. The computerized marketing system can provide these capabilities within one market or across many markets.

In yet another aspect, the invention provides a customer acquisition and retention system (CARS) and an object-oriented business computer-implemented modeling framework that may be used to construct such system. The object-oriented framework implements a computer-implemented database model that is well suited to a variety of different platforms, including relational database platforms. The framework includes market agents that encapsulate a plurality of attributes and operations performed by legal entities (e.g. persons using the system) and computer agents. The framework also defines a property (e.g., real estate, goods) and service object model that encapsulates attributes and operations associated with properties and services administered by the system. The framework further defines a campaign object model that encapsulates attributes and operations associated with campaigns (e.g. marketing campaigns) that are orchestrated to achieve predetermined objectives. In addition to the above components, the framework also includes further object models to represent listings and deals involving the property or services administered by the system, and an object model to represent geographic and demographic information.

For a more complete understanding of the invention and its many advantages, refer to the following specification and to the accompanying drawings.

DESCRIPTION OF THE PREFERRED EMBODIMENT

Figure 1:
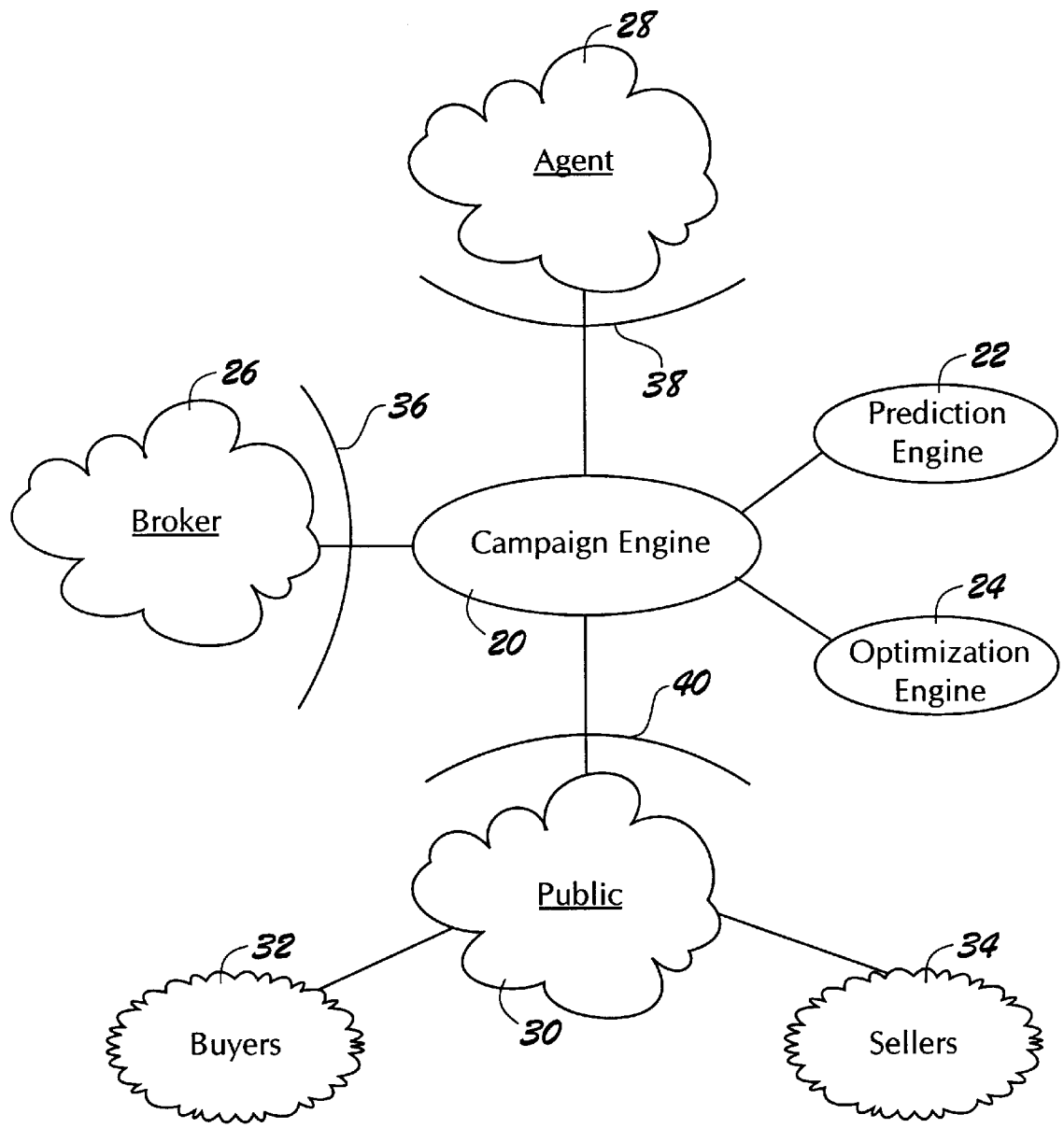
FIG. 1 is a top-level entity relationship diagram depicting the system architecture of a presently preferred embodiment of the marketing system of the invention.

The presently preferred system architecture for the computerized marketing system of the invention is illustrated in FIG. 1. FIG. 1 is an entity relationship diagram that illustrates some of the major components of the system.

At the heart of the system is the campaign engine 20, which uses a prediction engine 22 and an optimization engine 24. The campaign engine provides several interfaces by which users of the system interact with the engine. The preferred implementation identifies three classes of users; and three user interfaces are provided. The classes of users include a broker population 26, an agent population 28, and a public population 30. As illustrated, the system distinguishes among members of the public as being part of the (actual or potential) buyer's population 32 or the (actual or potential) seller's population 34.

Brokers 26 communicate with the campaign engine through the broker interface 36. The agent population 28 communicates with the campaign engine 20 through agent interface 38. In the preferred embodiment certain information concerning the public population may be supplied to the campaign engine by the real estate broker, by the real estate agents, or by the marketing system designer as a set of initial data upon which the system optimizes. If desired, these data may be input through public interface 40 as well. In this context, the designation "public" interface connotes that the data are about members of the public, and not necessarily furnished directly by members of the public. However, the preferred embodiment also allows members of the public to interact with the campaign engine through public interface 40. As will be discussed below, the marketing system of the invention is designed to develop different marketing campaigns (outbound) and then harvest data about the responses to those campaigns (inbound). If desired, the marketing campaigns may include direct interaction with members of the public. Examples include websites on the Internet, computer monitoring of telephone hotlines, data entered through questionnaires at open houses, user interaction with electronic kiosks, and the like.

Figure 2:
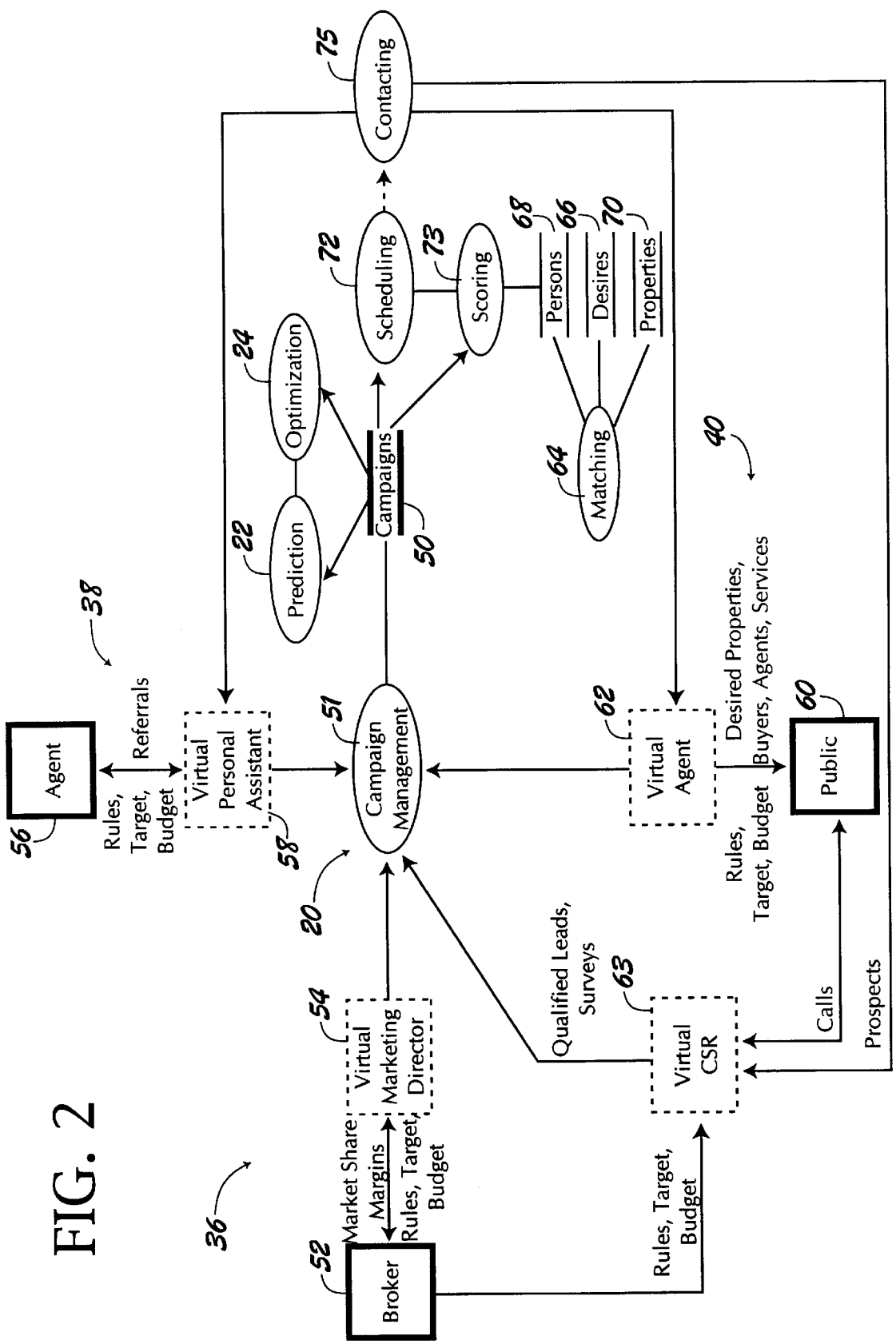
FIG. 2 is a data flow diagram of the embodiment of FIG. 1, showing additional details about each of the major components of the preferred embodiment.

Referring to FIG. 2, a data flow diagram of a preferred implementation is illustrated. This diagram serves to clarify the concepts outlined in FIG. 1. Each of the user interfaces discussed in the previous section is implemented in the form of a "virtual agent" through object-oriented software. Rather than a set of general menus or functions, each user has a customized personal software agent provided by the system to meet their needs. More specifically the broker interface 36 at a minimum is comprised of a virtual marketing director object 54 and a virtual customer service representative object 63; each serves as the broker's alter ego in communicating with the campaign engine. Likewise, the agent interface 36 is comprised of a virtual personal assistant object 58 that communicates with campaign engine 20 on behalf of the real estate agents. The virtual personal assistant automatically handles many functions currently handled by human assistants hired by real estate agents. The public interface 40 is comprised of a virtual agent object 62 which allows potential or existing customers to manage campaigns in order to obtain a subset of the services provided by actual licensed real estate agents. These virtual worker interfaces allow brokers 26, the public 30 or agents 28 to create and manage campaigns 50 via providing rules, targets and budgets to the campaign process 51. In return, referrals (names of potential customers) are provided to agents. Desired properties, agents or services are returned to the public. Qualified potential agent recruits or customer leads to the broker. In every case this is achieved via a scheduling process 72 and a contacting process 75.

The campaign engine 20 itself is then comprised of at least one instance of the campaign management process 51 managing at least one instance of a campaign within a campaign data store 50. As illustrated, the prediction engine 22 and the optimization engine 23 access the campaign data store 50 and are managed by the campaign management process 51. In addition, campaigns 50 may populate a desire data store 66 with potential or existing customer's desires for types of properties from a property store 70, agents and services from a person store 68 or properties, neighborhoods, or communities from a property store 70.

The matching process 64 is coordinated with a scoring process 73 to sort and assess person or property data for the campaigns. The matching process ensures that data received from the user interface via virtual workers can be matched to persons in the person store 68 and/or properties in the property store 70.

There are several types of scores generated for different campaigns by the scoring process 73. An agent eligibility score is used to categorize agents according to recent performance. A listing score and sales score are derived for properties based showing how likely they might be to be listed or sold. Potential customers obtain a contact priority score based on the recency, frequency and cost of contacts to date versus their sales revenue potential. Potential customers are also assigned to a home buying or selling readiness state estimating how likely they might be to buy or sell a house. In all cases scores are derived from user supplied rules for interpreting survey questions or market behaviors. These rules are supplied by the user to particular campaign via the respective virtual worker interface. Scores may also be derived from the prediction engine 22 to generate a predicted score. Currently, this is embodied by the use of holographic neural net technology to enfold patterns of actual data to predict scores based on historical results.

After matching and scoring have been done, the optimization engine 24 is utilized. The optimization engine 24 is currently embodied via an exchange process based on genetic algorithm and game theory techniques described below. In the optimization engine exchange process, a software version of a "free market" is created where any objects in this system (e.g. slots in a call queue, positions in a mailing list, houses for sale, agents, services, etc.) may enter the exchange as either "buyers" or "sellers". The exchange allows the software objects to create bids and make deals in an iterative process that trades-off individual best deals against the aggregate set of deals in order to come as close to the campaign sponsor's goals as possible. Bids are generated based on bidding algorithm rules, targets, and budgets supplied by the user via virtual worker interfaces 62, 63, 54, 58 to the appropriate campaign. The bidding algorithm rules provided by the user essentially weigh the matching process 64 criteria for desires 66, and the relevant scoring process 73 generated scores, in order to create a bid that optimizes the user's goals.

Using the same hotline example as cited previously will illustrate this approach. Members of the public call the broker's hotline. This broker asset is managed by instance of a (inbound hotline) campaign 50 and campaign management process 51 which carries and executes the appropriate rules, targets and budget definitions. The virtual marketing director 54 obtains these rules from the broker 52. The matching process 64 takes each hotline call's detail (caller id, call flow details, properties listened to by the caller, etc.) and matches respective persons in the person store 73, desires in the data store 66 and properties in the property store 70. Having done so, the scoring process 73 generates a contact priority score for each caller, a home buying or selling readiness state score is also calculated based on previously supplied rules. The prediction engine 22 submits to a properly trained holographic neuron the call detail for the caller, and a predicted home buying or selling readiness state score is derived based on historical data. A software object representing this hotline caller now goes to the optimization process 24 exchange as a "seller". It "advertises" its availability on the exchange. Specifically, it advertises that it is available with a certain set of scores. The broker 52 has also created another (outbound telemarketing) campaign 50 to manage the process of calling out to prospective leads from the public 60 to obtain qualified referrals for agents 56. This outbound telemarketing campaign was also set up via the virtual marketing director 54.

The call center can only make so many calls to the public per day. This total constitutes a call queue. The slots in this call queue go to the optimization engine 24 exchange as "buyers". Slots at the top of the call queue (i.e. the calls to be made earliest in the day or by the best customer service representatives) are allocated a larger budget by the campaign sponsor to obtain the most qualified leads. The budget, rules for bidding and any specific targeting goals have already been supplied via the definition of the outbound telemarketing campaign and the virtual marketing director 54.

In the exchange process, all buyers (call queue slots) get to bid on all sellers (hotline callers with scores) in such a way as to allow the best possible individual deals (lowest cost for best deal) as well as the aggregate set of deals (not exceeding some total budget). Thus, deals between buyers and sellers may be pending until all buyers and sellers have been through the process enough times that overall goals are met. The optimization process is an iterative one and involves far more capabilities than any sequence of sorts or matches could produce. The overall process is similar to that obtained with genetic algorithms; a population (buyers and sellers) is allowed to interact in multiple ways until local and global optimization takes place (i.e. best individual deals and best aggregate set of deals). In contrast to genetic algorithm models however the possibility of collaboration exists between buyers and seller in the exchange process, and in this sense the current system employs a technique that is enhanced by game theory and software agent interaction protocols. The end result is that the inbound campaign managing the hotline interacts with the outbound telemarketing campaign managing the call center to achieve the optimum list of hotline callers to call back the next day.

This capability can provide for a plurality of campaigns for all classes of users. For example, agents 56 can interact with virtual personal assistants 58 to set up customized self-optimizing campaigns for their listings which automatically allow all prospective buyers to compete in the exchange for a chance to be contacted by that agent's campaign. Similarly, members of the public 60 can set up self-optimizing campaigns for marketing their own house which automatically allows all prospective marketing services (classified ads, postcards, telemarketing, use of an agent, etc.) to compete in the exchange for the available budget dollars. A broker 52 can use the system to set up a campaign to obtain the optimum list of agents to recruit to work for the broker. In such a broker recruiting campaign, software objects representing those potential agent recruits from competing brokers would go the exchange scored by productivity history, markets served, age, credentials, etc. They would compete for the chance for the broker to contact them and be invited to join that broker's firm. In addition, the actual compensation plan for existing and recruited agents can be managed by another broker campaign that optimizes those plans to improve margins by improving productivity.

Figure 3:
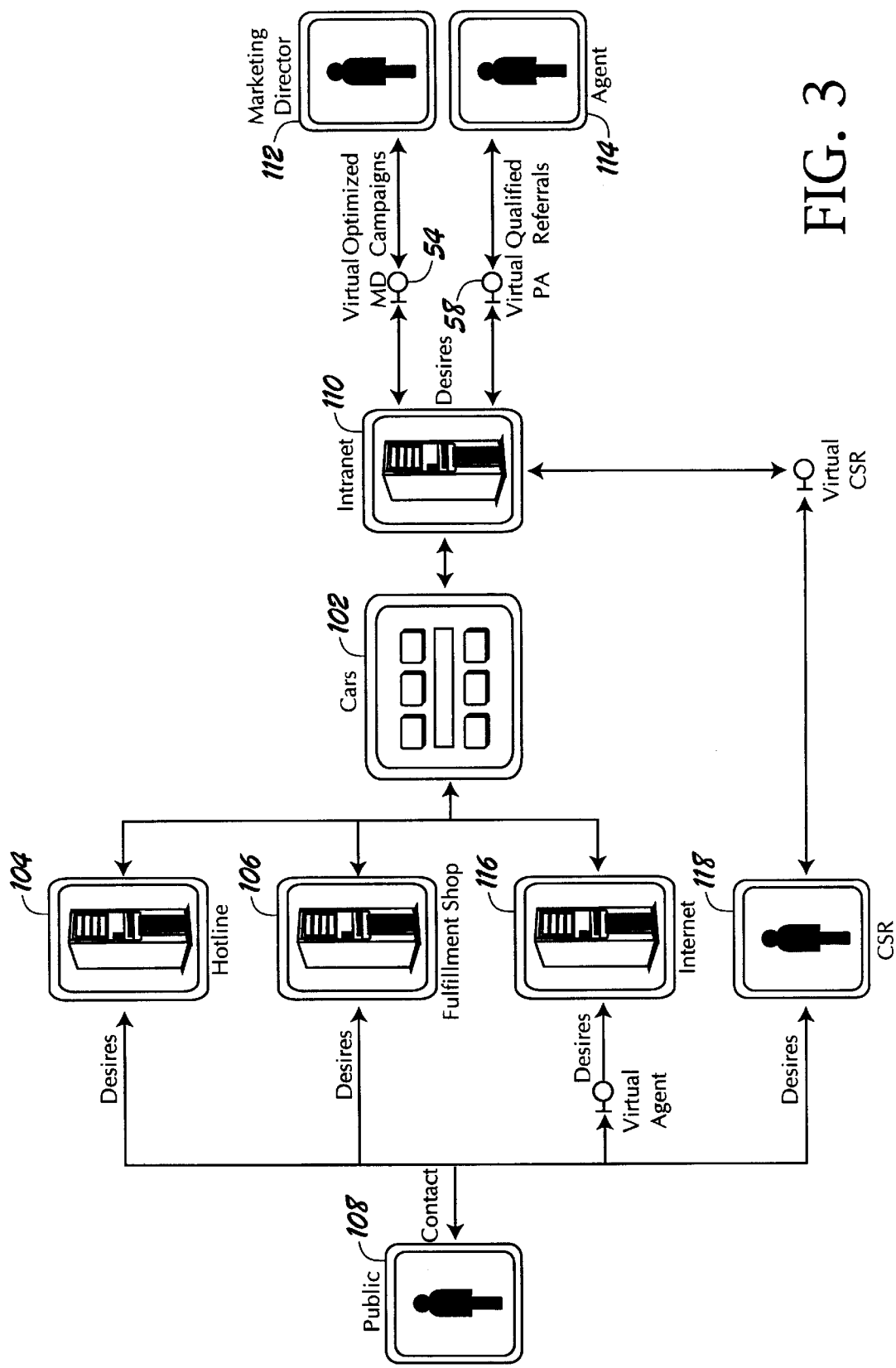
FIG. 3 is a use case diagram of a simple embodiment of the marketing system, illustrating how the invention might be employed in a typical residential real estate brokerage environment.

Referring to FIG. 3, this use case diagram of a simple or minimal version of the presently preferred implementation shows how the invention might be deployed in a typical residential real estate brokerage environment that includes a telephone hotline, a direct mail fulfillment shop, a customer service representative call center and an internet web site.

The computerized marketing system itself is shown at 102. The real estate brokerage hotline computer 104, direct mail fulfillment shop 106, internet web site server computer 116, and customer contact center representative at 118 all serve to allow members of the public 108 to communicate with the computerized marketing system. In the case of the internet web site, this data would be input through the public object 60 of the computerized marketing system via a virtual agent 62 directly connected to the computerized marketing system. In the cases of the contact via the hotline or a direct mail campaign response, data from computers managing these assets is passed to the computerized marketing system via network connections. In the case of contact via live phone call with the customer service representative (CSR) 60, data is entered by the CSR through use of the virtual CSR 63 over a network which constitutes an brokers intranet 110.

Such an Intranet also constitutes the means to connect agents and broker's employees to the computerized marketing system. Agents 114 would interact with virtual personal assistants (virtual PA's) 58 over the Intranet. Marketing directors 112 would interact with virtual marketing directors (virtual MD's) 54 also via this Intranet.

Figure 4:
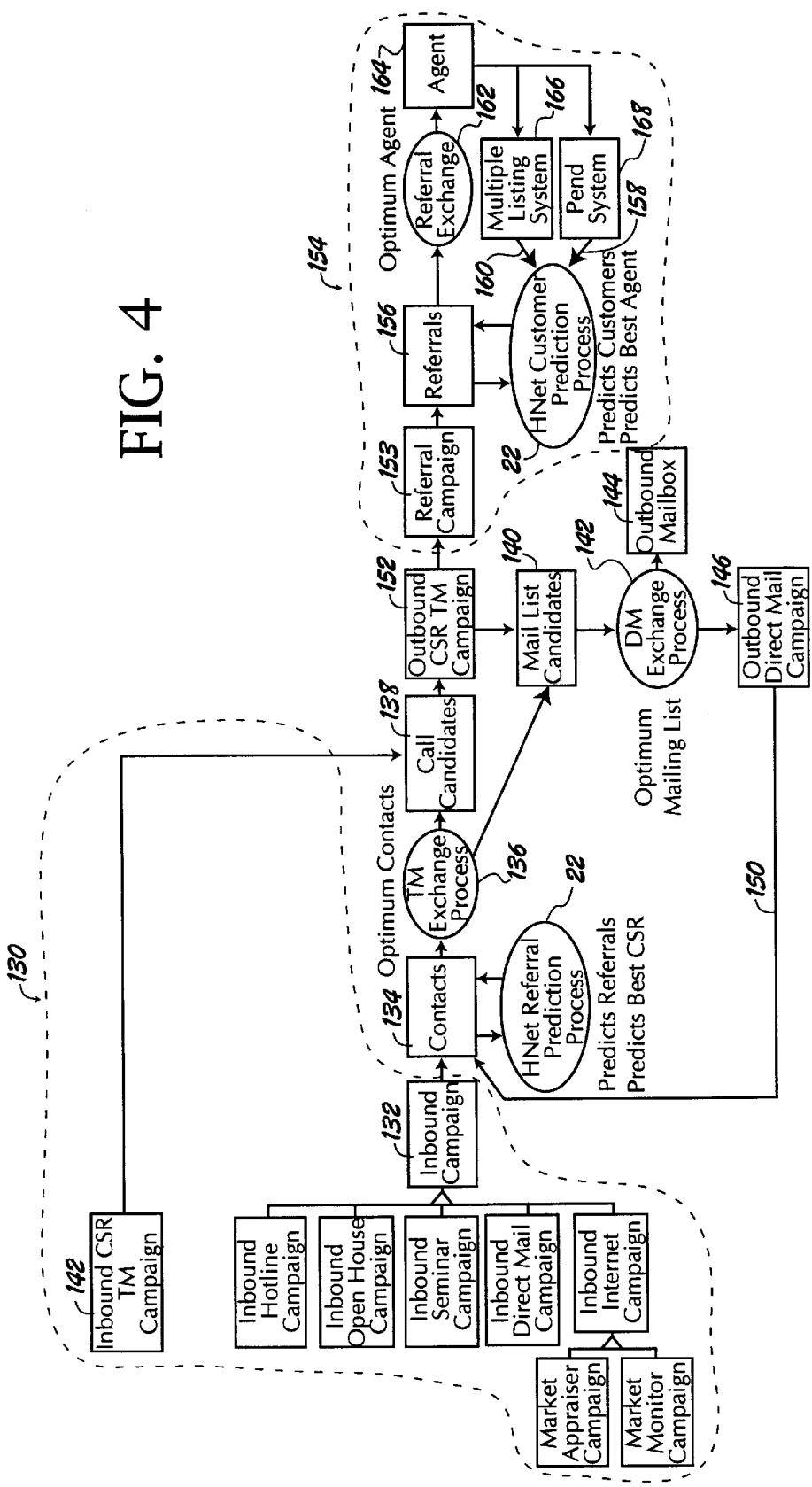
FIG. 4 is is a detailed data flow diagram showing how referral data is generated and processed by the software components of the system.

FIG. 4 illustrates the potential customer referral generation process as performed by the preferred embodiment of the computerized marketing system previously described. This same process is available to use by the broker to handle agent recruiting as well. It illustrates the key components available by cascading campaigns together to achieve optimization of larger business processes.

FIG. 4 is a data flow diagram showing how referral data is generated and processed by the software components of the system. The referral generation process involves both inbound and outbound campaigns. In FIG. 4, the components involved primarily in the inbound campaigns are shown generally at 130. Any number of different inbound campaigns can be active at any given time. Thus in FIG. 4 several different inbound campaigns have been illustrated (i.e., hotline, open house, seminar, direct mail, Internet). These assorted inbound campaigns communicate with the inbound campaign component 132 that supplies data to create an aggregated set of contacts 134 from all the inbound campaigns. These contacts use the services of the HNeT holographic neural network prediction engine 22 to generate predicted scores for home buying and selling readiness state to complement the scores calculated via the scoring process 73 as described previously. The optimization engine 24 component spawns a telemarketing exchange process 136 component. It receives scored contacts 134 and analyzes the data to determine which of these optimum contacts would be best handled by mailing list and which would be best handled by direct telephone call. Note that the inbound CSR telemarketing campaign component 142 may also directly supply contact data to component 138. Recall that the inbound CSR process is handled by the virtual CSR 63. The exchange process component 136 thus routes the respective contacts data to the call candidate's component 138 and to the mail list candidate's component 140 based on this determination. It also optimizes the sequence of call candidates for the Outbound CSR TM (telemarketing) Campaign 152 exactly as described previously for the Hotline in the discussion regarding the optimization engine and exchange process. The only difference is that the overall referral generation process described in FIG. 4 combines all inbound campaign leads from all inbound sources into one exchange process allowing all potential leads to compete for call backs or mailings. The mail list candidates may be further optimized using the direct mail exchange process component 142. This component will either cause outbound mail to be sent via outbound mailbox 144, or it will redirect less valuable mailing list candidates to the outbound direct mail campaign component 146 where they will eventually be combined with future contacts to again compete for an opportunity to be assigned to an outbound campaign. In general, the direct mail campaign will be initially structured by rules, target and budget information supplied through the virtual marketing director agent 54 or through the virtual personal assistant agent 58

Outbound call candidates, routed to component 138, are forwarded to the outbound CSR telemarketing campaign component 152 to administer the desired campaign. In this case, CSR's 118 contact the optimized leads that have populated the call queues to ascertain which ones are ready to buy or sell a property and agreeable to working with the brokers agents (or affiliate agents) to do so.

The computerized marketing system treats the referral of leads to the real estate agent as an outbound campaign directed, not to members of the public, but to the real estate agents themselves. In FIG. 4 the components primarily responsible for the referral campaign are shown generally at 154. Note that the prediction engine 22 operates upon referrals stored in the referrals component 156 and that multiple feedback loops 158 and 160 are provided to allow the system to be self-tuning. More specifically, call candidates supplied from the outbound CSR telemarketing campaign components 52 are supplied to the referral campaign component 153, which in turn stores referrals in component 156. The referral exchange processing component 162 extracts optimum agent referrals and supplies them to the appropriate agents designated at 164. In the preferred implementation, these sales leads would be supplied as qualified referrals through the virtual personal assistant agent 58.

Feedback regarding the status of these forwarded referrals does not have to rely on the agent's co-operation in providing status updates. The broker Pend system component 168 identifies which referrals have become actual customers of that agent and that broker. A component that connects to existing multiple listing systems (MLS's) 166 allows the computerized marketing system to determine if a referral to an agent became a customer of a different agent or broker.

This feedback loop allows the prediction engine 22 to learn to predict which leads actually are likely to become referrals and customers and which CSR's should work with which leads as shown at 22 and 134. Similarly, the prediction engine can also use this feedback loop to predict which referrals are most likely to be customers and which agents would be best matched to those referrals at 22 as shown at 22 and 156.

Thus FIG. 4 illustrates both the referral process and the way this process implements feedback loops that enable the computerized marketing system to learn patterns over time to improve performance beyond what user-supplied rules alone can achieve.

The Object-Oriented Business Modeling Framework

Figure 5:
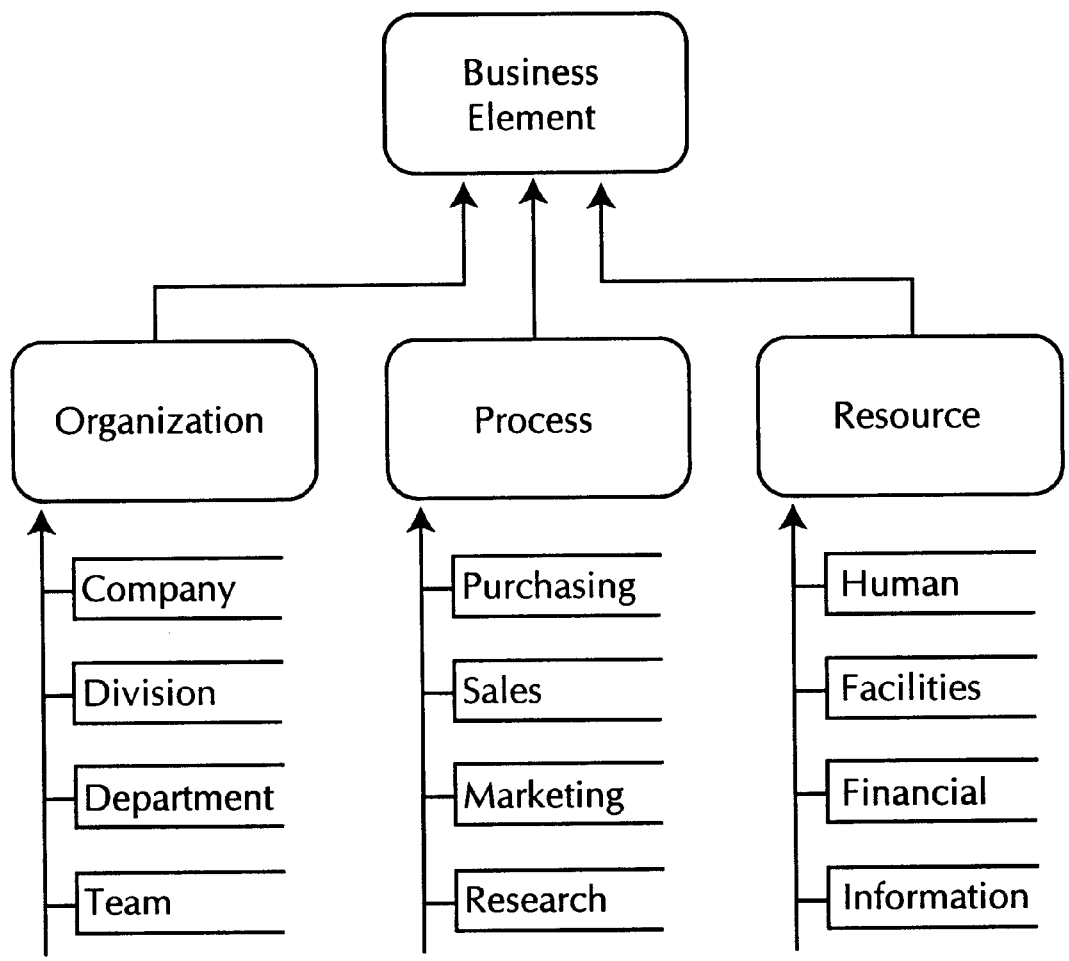
FIG. 5 is a top-level block diagram view of a business modeling framework, useful in understanding the concepts that may be employed in developing a preferred embodiment of the marketing system.

The computerized real estate marketing system may be constructed using a number of different programming models. The presently preferred implementation is constructed on an object-oriented model, organized around a business modeling framework that hierarchically organizes business objects into three major sub-classes, namely an organization class, a process class and a resource class. Each class may have a plurality of instances of objects within that class (i.e. multiple resource objects in the resource class). This framework is illustrated in FIG. 5, which is included here to acquaint the reader with concepts that may be employed in developing a preferred embodiment of the invention. For more information regarding this approach to a business modeling framework, see "Business Engineering With Object Technology," David A. Taylor, John Wiley and Sons 1995.

Figure 6:
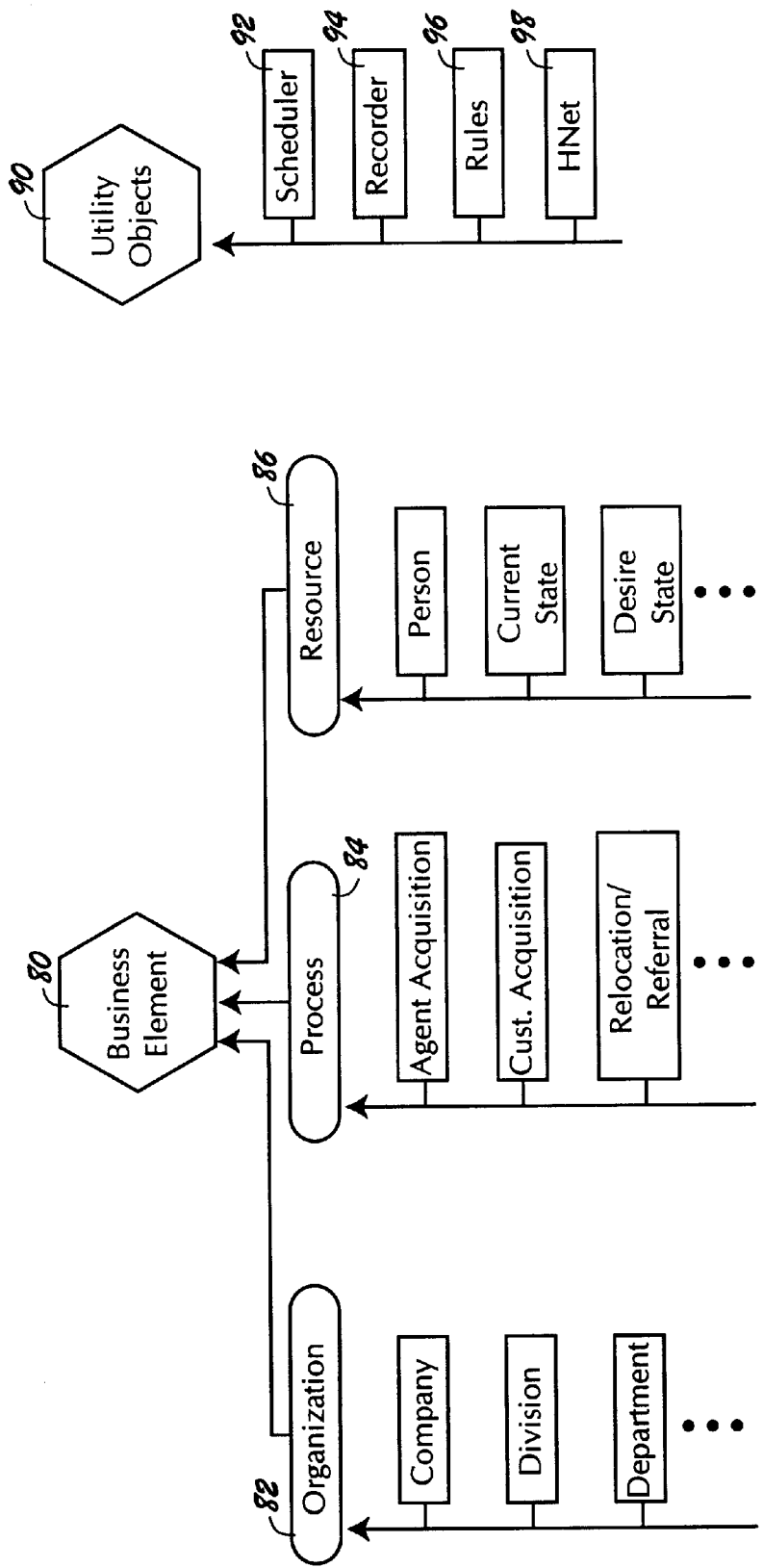
FIG. 6 is a mid-level block diagram view of a business modeling framework, illustrating further details of how a preferred embodiment of the marketing system may be constructed.

Although object technology will be described here, it should be understood that the present invention can be implemented using other programming techniques, and need not be based on the business model framework shown in FIG. 5. More specifically, the current implementation is a modified form of the business element framework shown in FIG. 6. FIG. 6 illustrates the business element object 80 as a top node and broken down into individual classes of objects: organization objects 82, process objects 84 and resource objects 86. These individual classes of objects are in turn subdivided into subclasses of objects that will be described more fully below.

Accessible by any business element (i.e., any organization object, process object or resource object) are a set of utility objects 90. For convenience, these utility objects are shown under a separate node at the same hierarchical level as the business element node. The utility objects include scheduler object 92, recorder object 94, rules object 96 and a neural network object 98. The presently preferred embodiment uses holographic neural network technology (HNeT). The neural network object comprises the prediction engine 22 as illustrated diagrammatically in FIG. 2. Although other types of prediction engine technology may be used, the current embodiment uses holographic neural technology that employs associative memories utilizing confidence-mediated associations as described in U.S. Pat. No. 5,214,745, entitled "Artificial Neural Device Utilizing Phase Orientation in the Complex Number Domain to Encode and Decode Stimulus Response patterns" and U.S. Pat. No. 5,515,477 entitled, "Neural Networks," both by John Sutherland. For further information on holographic neural network theory, see "fuzzy, holographic, and parallel intelligence, the sixth-generation breakthrough," Soucek, Branko, Chapter 2, pages 7–92) John Wiley and Sons, 1992.

Figure 7:
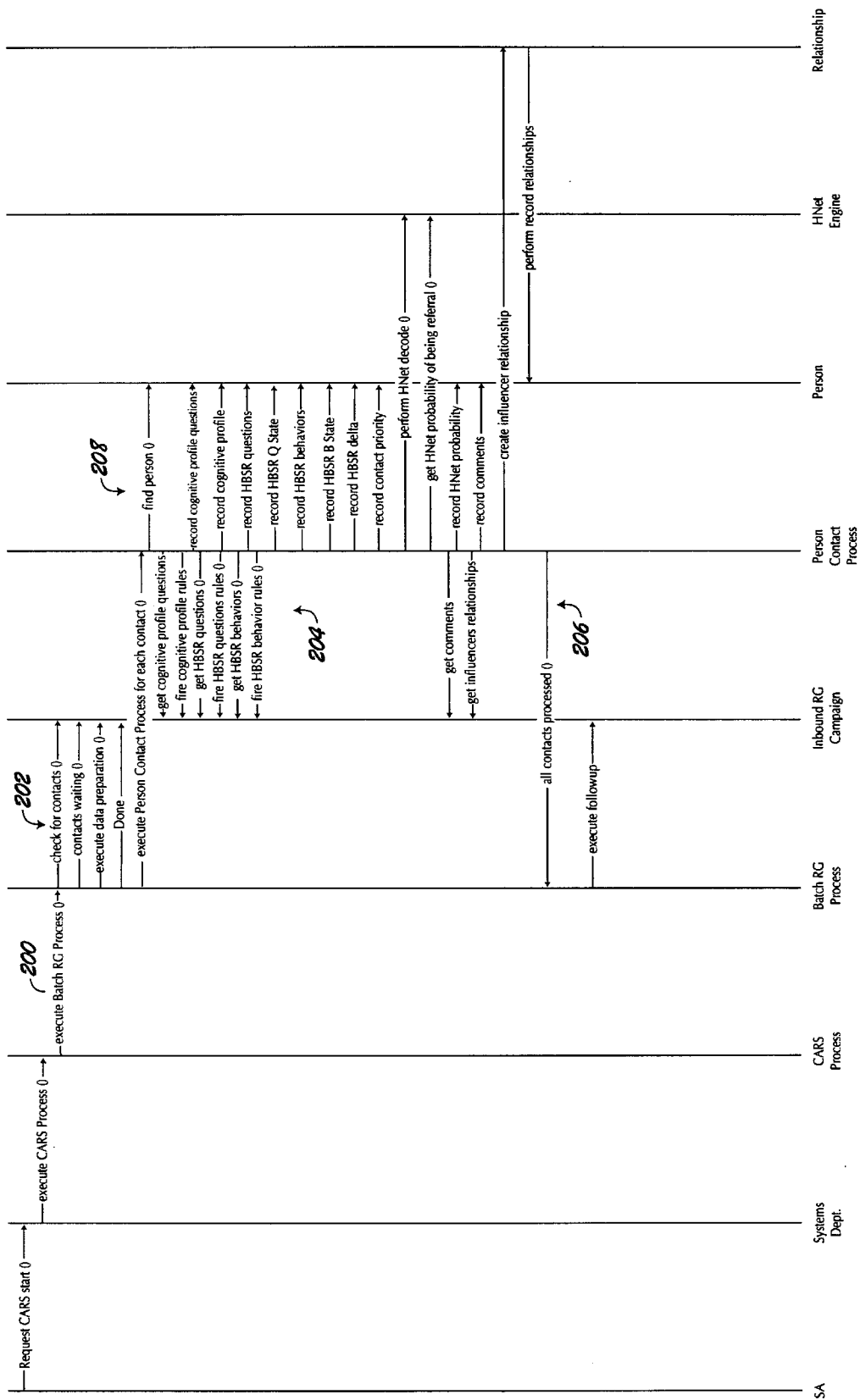
FIGS. 7 and 8 are event trace diagrams illustrating the referral generation process and the inbound call handling process, respectively.
Figure 8:
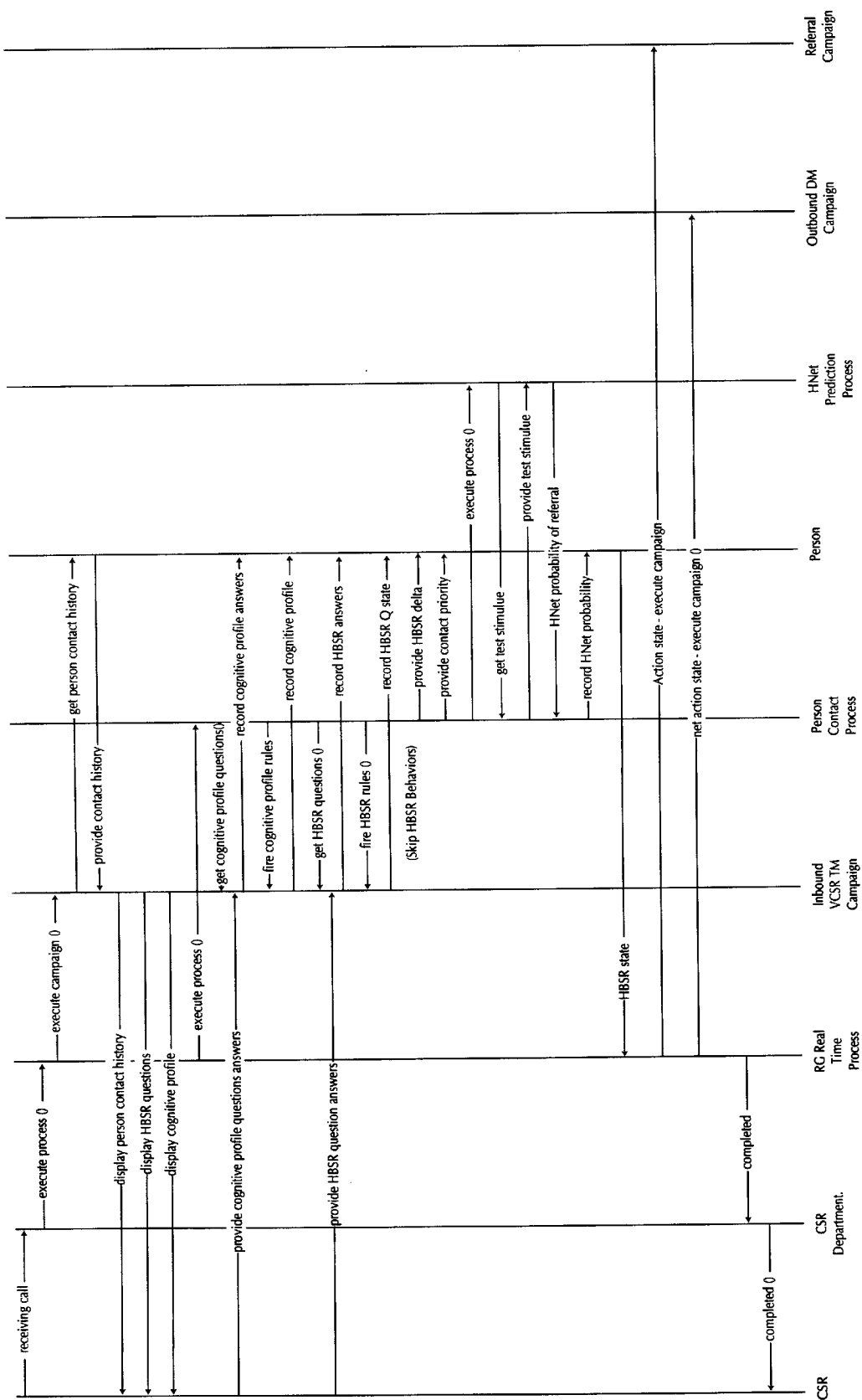

FIG. 6 illustrates how objects can be hierarchically defined to build the system illustrated in FIGS. 2 and 3. Some of the dynamic behavior of the current embodiment may be seen from FIGS. 7 and 8. FIG. 7 illustrates the referral generation batch process as an event trace diagram. FIG. 8 shows a similar event trace diagram for the inbound CSR telemarketing call processing. In FIGS. 7 and 8 the computerized marketing system is referred to by the acronym CARS (customer acquisition and retention system). In FIGS. 7 and 8 the vertical lines are labeled at the bottom to correspond with different components or objects within the system. Messages are passed between components or objects to effect the referral generation and inbound CSR telemarketing call processes. In general, time flows from top to bottom in these figures. Thus, in FIG. 7 the process begins with the user requesting through a virtual systems administrator interface (SA) that the computerized marketing system (CARS) be started. This request may be relayed through a system department interface to the CARS system, itself. The computerized marketing system (CARS) is preferably configured to initiate a customer acquisition process which in turn triggers a batch referral generation process by sending an appropriate message, designated at 200 in FIG. 7, to the batch referral generation (RG) process.

The batch referral generation process then determines its current operating state through a series of messages with the inbound referral generation campaign process, as depicted at 202. This entails checking with the inbound RG campaign process to determine if there are any unprocessed contacts pending and by then requesting the inbound RG campaign process to execute a person contact process for each contact pending. This, in turn, triggers the person contact process to obtain various information as illustrated at 204 generally pertaining to contact data about the person to be contacted. When all contacts have been processed in this fashion, the person contact process sends a message at 206 informing the batch RG process that all contacts have been processed. The batch RG process then sends a message to the inbound RG campaign to execute a follow up.

As another example of the dynamic behavior of the computerized marketing system another process is documented in FIG. 8. The inbound CSR telemarketing call process proceeds through a series of messages between modules or objects, in a fashion similar to that described in FIG. 7. The process illustrated in FIG. 8 is exemplary of the manner in which the other major interfaces work within the system.

Figure 9:
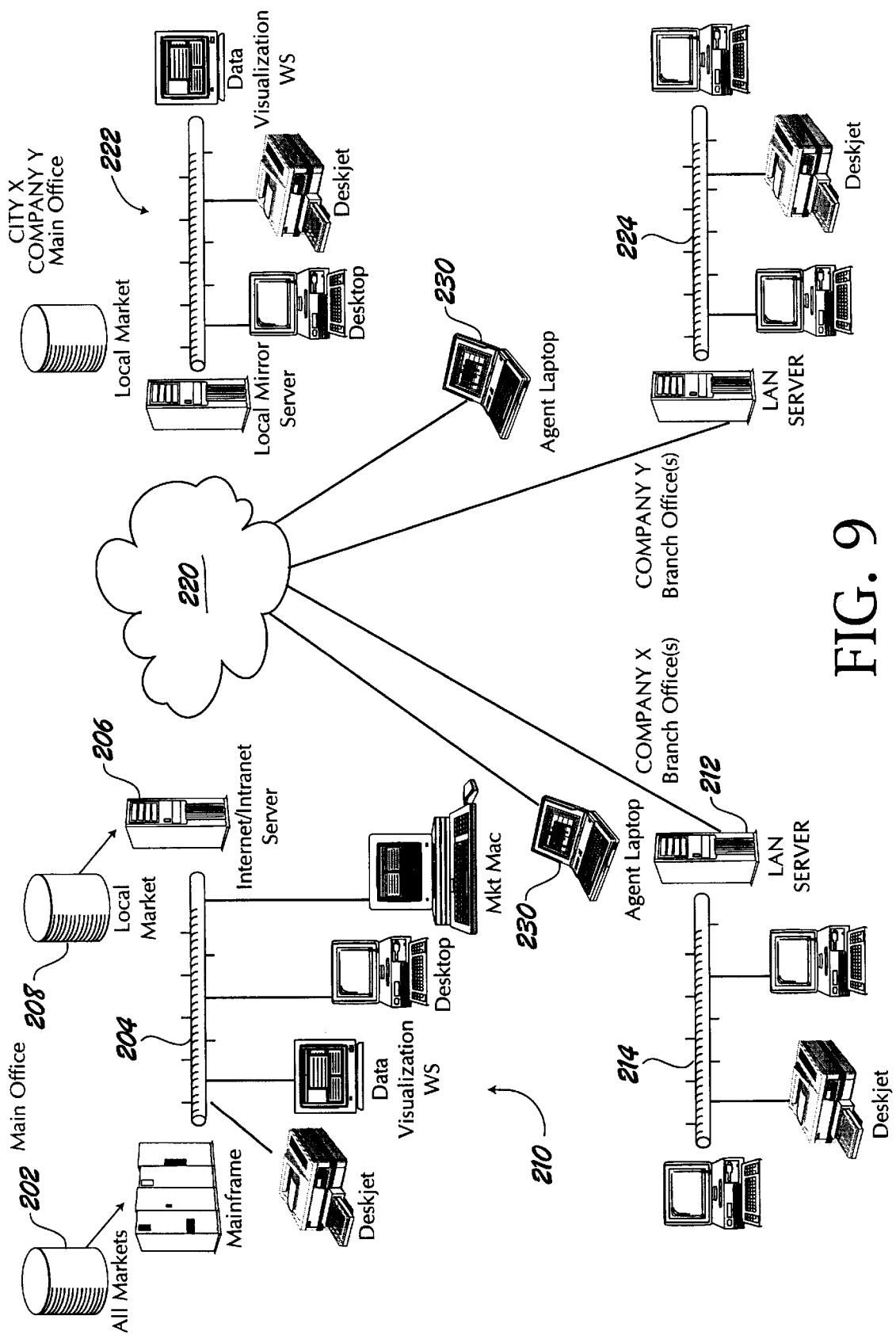
FIG. 9 is a hardware implementation block diagram showing one possible hardware configuration for implementing the marketing system.

The present invention can be deployed in a variety of different hardware configurations. FIG. 9 illustrates one example of a suitable hardware configuration. The data used by the computerized real estate marketing system may be stored on a main database server 200, having a person database 201 and a property database 202 for storing records relating to all relevant real estate markets being handled by the system. In large-scale applications computer 200 may be a mainframe or large file server computer. Computer 200 is connected over a corporate backbone network 203 to an application server 205 that handles the business logic for the computerized marketing system. The application server 205 in turn is also connected by corporate network to a web server which handles allows all users to access the system via standard web browser software. As illustrated, a corporate Intranet client 210 accesses the system locally with a web browser. Offices Intranet clients 225 access the system via a corporate wide area network (WAN) 220. Dial-in Intranet clients 212 access the system by reaching the Internet. Members of the public access the system via a public web site as Internet clients.

Because the computerized marketing system assumes only web browsers for clients, it makes very modest demands on the type of device the clients (agent, employee or member of public) uses. PC's and NC's, laptops, PDA's, etc. can all be used as well as most operating systems for these devices.

In addition, the use of a three tier architecture with web (TCP/IP) protocols and open (CORBA) middleware allows the system to be deployed by many different brokers whose local systems can not only communicate with one another, but conduct business across the web. Specifically, objects from one broker's system can move over the web to another broker's system and participate in the exchange optimization process in that broker's market.

Thus the current design can conduct business across a community of brokers with the appropriate objects seamlessly migrating from one market to another. An example would be the ability of a local broker to host an exchange where buyers from many markets compete to obtain properties or services in that local market. This computerized marketing system is a superset of current multiple listing systems, broker or agent web sites, relocation and referral networks and BackOffice transaction systems. If deployed by multiple trading partners, it is capable of operating as a single unifying electronic commerce environment for commerce within residential real estate or similar consumer marketing industries using any combination of selling modes (i.e. independent agents, contract sales force, no sales force, etc.).

An Object Model for the Customer Acquisition and Retention System (CARS)

In designing a customer acquisition and retention system (CARS) according to the principles of the invention, it can be helpful to construct an object model. The object model records the designer's current understanding of the scope of the system and is used to extend the model and to fix oversights as development of the system proceeds. An exemplary object model is described here. The object model described here is intended to teach concepts useful in practicing the invention. The object model presented here is not intended as a limitation of the invention in its broader aspects.

This object model presented here is an analysis model. The goal of analysis is to specify what needs to be done, not how it is done. During analysis we specify the object structure of a customer acquisition and retention system that is implied by the requirements. Analysis is a difficult task in its own right, and we must fully understand analysis before we can handle the additional complexities of design.

During design we transcend the direct implications of the requirements and decide how to realize deep functional goals. The full implementation of CARS will have additional objects that are not specified in the analysis object model.

As an example of the distinction between analysis and design consider the notion of an exchange. An exchange can be used to match listings and obtain deals. An exchange is not an analysis construct but is appropriate during design. During analysis we note there are potential buyers and sellers of properties and services and that they must be matched in some way. During design we specify how matching occurs.

Note that we have organized our object model into packages. A package is merely a collection of classes, associations, and generalizations with a common theme that is convenient for presentation purposes. Each association and generalization appears in a single package. A class may appear in multiple packages and provides the means for binding packages. When a class appears in multiple packages, we define it in one package (and show its attributes and operations). In all other packages we merely reference the class (shown by suppressing its attributes and operations).

CARS is a ambitious application. Not surprisingly, the object model presented in this document is also complex. Specifically, the following technical aspects contribute to the complexity of the CARS model: metamodeling, historical data, dynamic behavior, and broad scope.

We have taken care to avoid multiple inheritance in this model. Multiple inheritance is confusing to understand and awkward to implement with a relational database.

1. Market Agent

Figure 10:
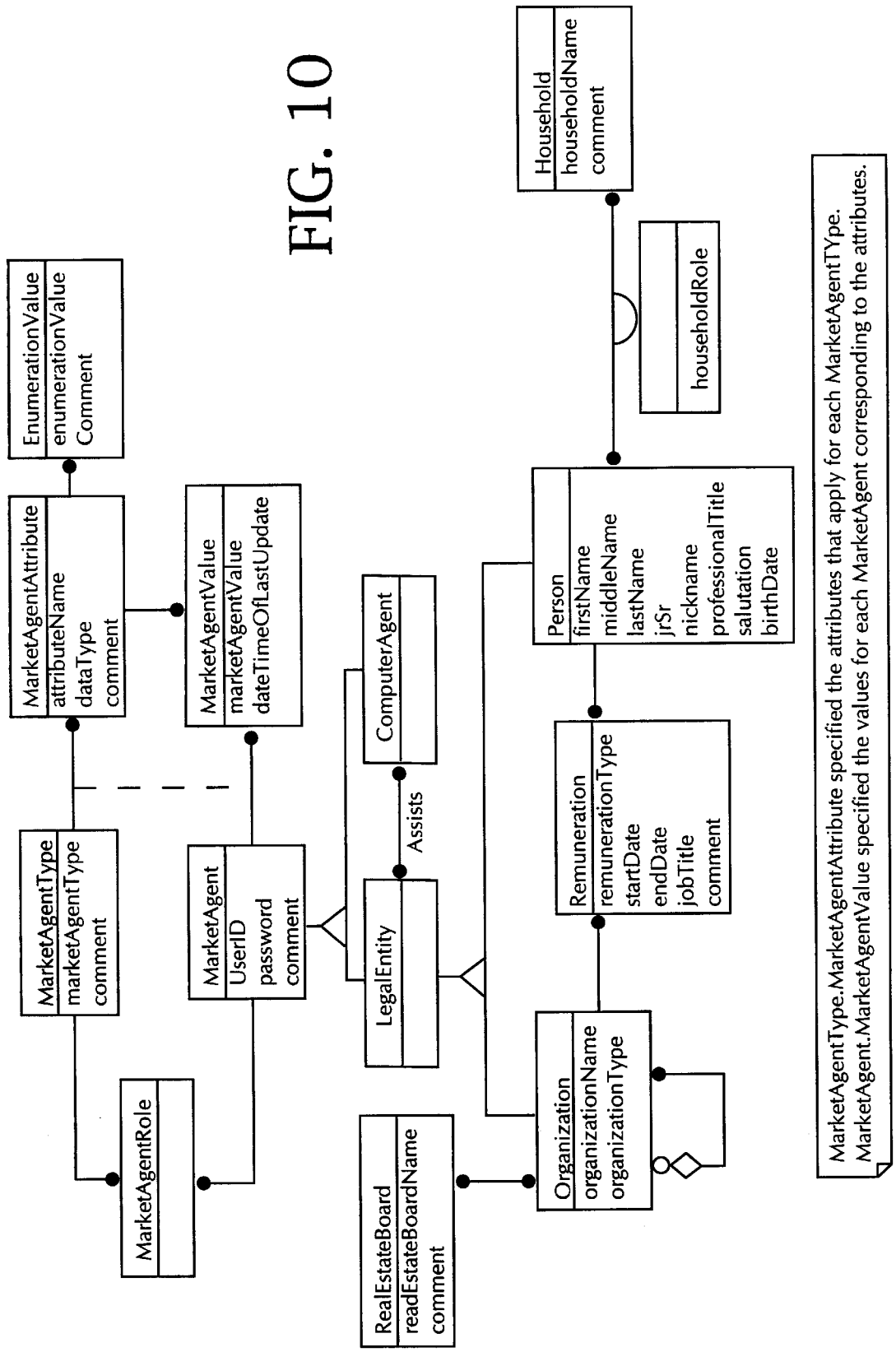
FIG. 10 is an object model for the MarketAgent package employed by the presently preferred CARS framework.

FIG. 10 describes market agents. We will start by explaining the LegalEntity class. A legal entity is an organization or a person. We use the name legal entity because both organizations and persons have legal standing in the real world. All three classes (Organization, Person, and LegalEntity) are prominent and referenced in other portions of the CARS model. In particular, we reference the LegalEntity class for tasks that can be fulfilled by an organization or a person.

A person can work for multiple organizations and an organization can have multiple persons working for it. We have promoted this relationship between persons and organizations to a class in its own right (Remuneration). Then we can keep historical data: past job titles and past organizational affiliations. There are various remuneration types such as employment (employer-employee) and contracting (client-contractor).

The jrSr attribute in the Person class indicates whether a person's name has a suffix such as Jr., Sr., II, or III. A person may have a professional title such as PhD., DSc., or M.D. A person may have a preferred salutation such as Mr., Dr., Mrs., Ms., and Miss. A person would ordinarily belong to a single household, but it is possible for a person to belong to multiple households, given divorce, remarriage, and other lifestyle arrangements. It is important to be able to track the members of a household because knowledge of a household may be relevant for the sale of real estate. A person may fulfill some role in a household, such as husband, wife, son, and mother-in-law.

A real estate board (such as the National Association of Realtors and a Multiple Listing Service) is staffed by multiple organizations and an organization can belong to multiple real estate boards. Ordinarily only realty firms would belong to a real estate board, but the model does not enforce this constraint.

We show an aggregation relationship on organization. An organization can consist of lesser organizations, which in turn can consist of even smaller organizations. This decomposition of organizations can occur to an arbitrary depth. Thus, for example, a company can have multiple divisions, a division can have multiple departments, and a department can have multiple offices. Some possible values for organization type are: company, division, department, and office.

Moving up the inheritance hierarchy, a market agent can be a legal entity or a computer agent. Computer agents can assist persons and organizations; the resulting productivity enhancement is part of the promise of CARS. The notion of a market agent is also prominent in CARS. We reference the MarketAgent class for tasks that can interchangeably be fulfilled by an organization, person, or automation. Our model is intended to be flexible and accommodate an evolving trade-off between work that persons and organizations must perform and that which can be handled by automation. Thus in the near future, the model (and corresponding database) can record manual tasks. As CARS becomes more sophisticated, the database can transition to tasks being performed by computer agents.

The top portion of FIG. 10 shows a metamodel for representing the attributes of market agents and their values. Ordinarily we would use generalization to show the different kinds of market agents and their attributes. However, such a generalization is troublesome for CARS, because the same market agent could belong to multiple subclasses (overlapping multiple inheritance). Thus a person who is the real estate broker market agent may buy a house in one deal, sell a house in another deal, and be a realty agent for other deals. Overlapping multiple inheritance is confusing to understand and difficult to implement, so we have avoided it.

Instead, we capture the information with a metamodel. There are many types of market agents, including marketing director, realty agent, customer service representative, customer service director, seller, buyer, builder, financier, loan officer, realty firm, and system administrator. (We include system administrator for convenience, although this market agent type does not seem directly germane to the objectives of CARS.) Each market agent may handle the responsibilities of any number of these types. Conversely, each market agent type applies to multiple market agents.

We call the combination of MarketAgentType and MarketAgent a MarketAgentRole. MarketAgentRole is also referenced elsewhere in the CARS model. Note that a market agent can fulfill a role more than once. For example, a person can be searching for two pieces of property and be in different states for buying each piece of property.

A market agent type has certain attributes that apply. Table 1 lists some sample attributes. The eligibility score measures the business effectiveness of a realty agent: the degree to which they follow-up on leads, their willingness to interact with CARS, the degree to which leads are converted into deals or lost to competitors, and the extent of positive customer feedback.

The contact priority score is calculated based on cost of contacts to date, recency of contact, frequency of contact, and potential value as a buyer or seller. This score will be used to prioritize resources and determine the organizations and persons most favorable for further efforts.

TABLE 1

Some MarketAgentAttributes

| MarketAgentType | MarketAgentAttribute |
| --- | --- |
| RealtyAgent | currentYearRevenue |
| RealtyAgent | currentYearProfit |
| RealtyAgent | currency |
| RealtyAgent | specialty (first time buyer, relocation, . . .) |
| RealtyAgent | eligibilityScore |
| Seller | annualSalary |
| Seller | currency |
| Seller | creditRating |
| Seller | contactPriorityScore |
| Buyer | contactPriorityScore |

The association between MarketAgentType and MarketAgentAttribute captures constraints—the attributes that are valid and apply for the various types of market agents. In contrast, the association between MarketAgent and MarketAgentValue stores the actual data—the values for each market agent corresponding to the attributes. The model (and corresponding database schema) does not force the links between MarketAgent and MarketAgentValue to be consistent with the links between MarketAgentType and MarketAgentAttribute even though that is our intent. Programming code in the final CARS software would have to enforce the dependency between values and constraints which is shown by a dotted arrow in FIG. 10.

Some attributes have a list of permissible values. We store these values with the EnumerationValue class. For example, the specialty for a RealtyAgent has specific permissible values that include first time buyer and relocation. The CARS software would have to enforce that all MarketAgentValues exist in the list of enumeration values, if enumeration values were specified for a MarketAgentAttribute.

With this metamodel we store all MarketAgentValues with a uniform data type of string. The CARS software must consider the data type of an attribute (string, integer, money, number, etc.) so that it can appropriately format the value for display to users.

The metamodel is flexible. We can readily define new market agent types and their attributes. Given this context, the CARS software would let the database store appropriate values for the corresponding market agents.

2. Property and Service

Figure 11:
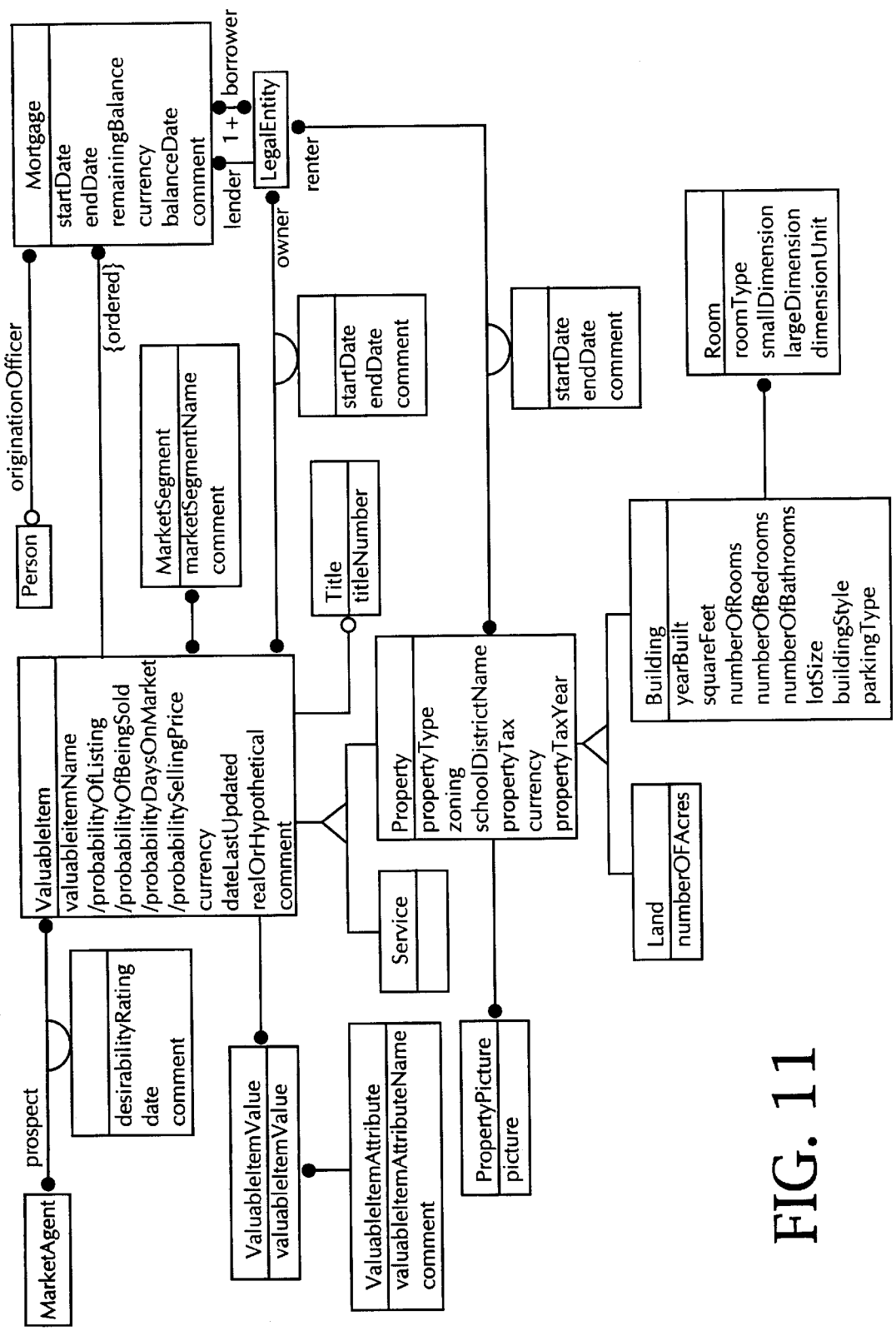
FIG. 11 is an object model for the Property and Service package employed by the presently preferred CARS framework.

FIG. 11 describes properties and services. A property is land or a building that may be subject to a real estate transaction. A service is some valuable consideration relevant to the real estate industry. Some customers do not want a traditional realty agent. However, they may be willing to pay the real estate broker for the service of advertising their house. Other services could be handling closing paperwork and screening property renters. We can track the rental history for a property.

A property may have a propertyType (residence, business, or investment), zoning information, school district, tax information, and graphic pictures for display on a screen. For extensibility we are storing the currency for all financial values. Given the broad scope of CARS and the ambitions of Insignia we believe it is likely that multiple countries and currencies could be encountered.

A property may be land or a building. Attribute parkingType is an enumeration with values that include carport, 1 car garage, 2 car garage, and 3 car garage. Attribute buildingStyle also is an enumeration with values that include A frame, split level, colonial, and contemporary.

A building may have multiple rooms for which data is stored. Some possible values for roomType are: living room, dining room, family room, kitchen, bedroom, den, workshop, laundry, office, and basement. The attribute dimensionUnit refers to the units of measure for the small and large dimensions of a room. In the United States, room dimensions are normally measured in terms of feet.

We generalize property and service into ValuableItem. A valuable item may have data computed by CARS as of some date such as probability of listing and probability of being sold. (The slash '/' in front of these attributes indicates that they are computed and are not fundamental information.) Currently properties and services are the only items relevant to CARS, but we could readily add subclasses to ValuableItem for a broader business need.

A valuable item may be a real property or real service, or it may be a hypothetical item that a prospect desires. A valuable item may be owned by multiple legal entities and there may be a history of ownership. A valuable item may have multiple mortgages that are ordered by their lien priority. A mortgage is provided by some lender (a legal entity) and has one or more borrowers (legal entities) responsible for servicing the debt. A title and mortgage origination officer may also be noted. (The notion of a deal in FIG. 13 lets us record past selling prices for a valuable item.)

There is almost an unlimited amount of information that we could record about valuable items. It is difficult to tell which data will be important to CARS and which will be peripheral. Consequently, we have abstracted our representation for miscellaneous data. A valuable item may have any number of pieces of data stored, each of which are bound to the appropriate valuable item attribute. This representation can handle multi-valued attributes. For example, there could be several values of the color for a house.

CARS is intended to support different market segments (also called brands). For example, the do-it-yourself or self-serve brand is intended to be low cost and gather business from the for-sale-by-owner market. Traditional real estate services are another brand. A third brand appeals to high-end customers and offers a team-based, enhanced service. The object model captures the positioning of valuable items into market segments.

3. Campaign

Figure 12:
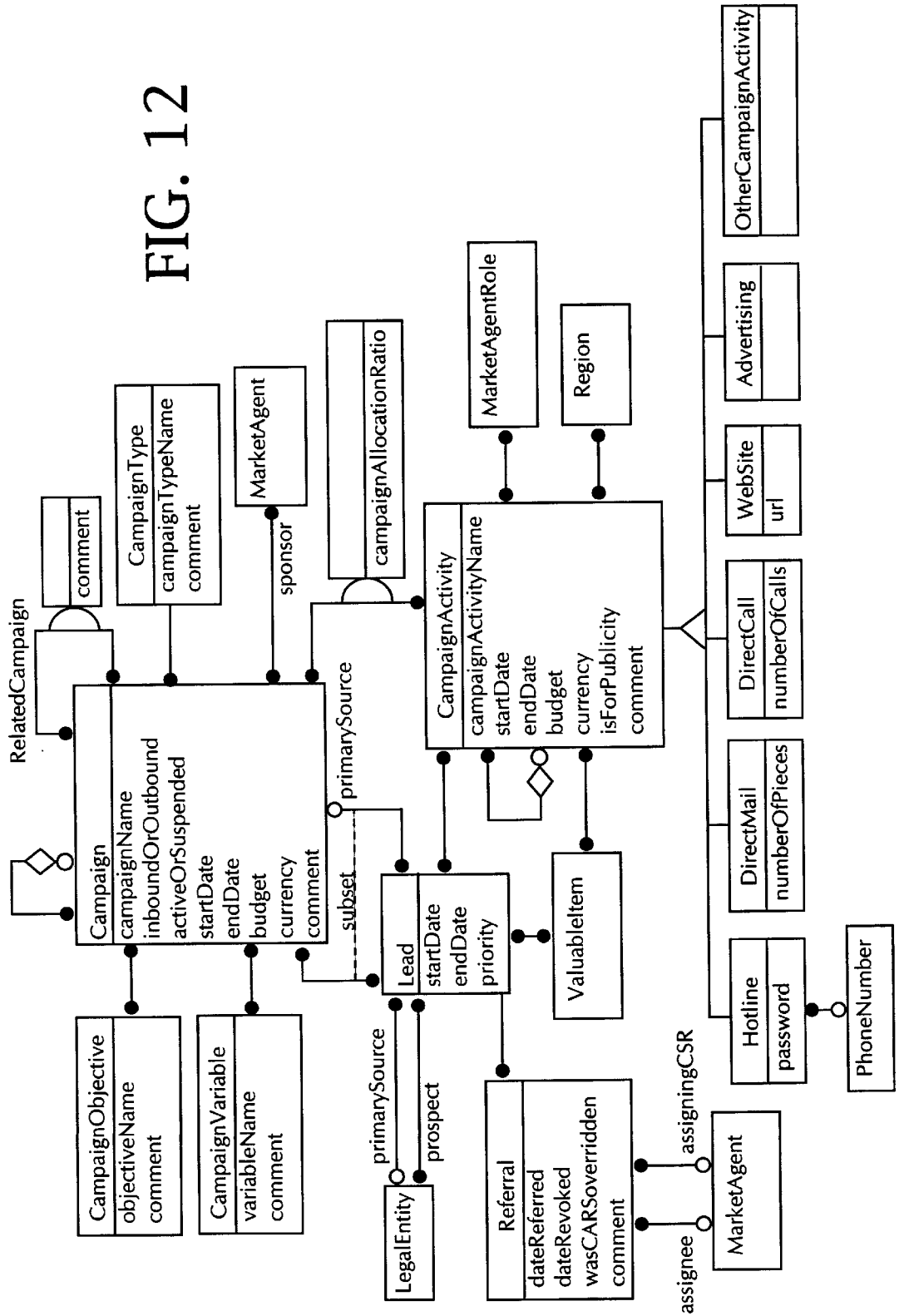
FIG. 12 is an object model for the Campaign package employed by the presently preferred CARS framework.

FIG. 12 presents an object model of the Campaign package. A campaign is a coordinated set of activities that attempt to marshal resources in such a way as to maximize the chances of the campaign sponsor's desires being met while minimizing the cost to do so. For example, a broker would like to create the largest pool of well qualified referrals at the least cost. A buyer might like to find the right house with the least expenditure of time and energy. A seller's agent would like to help the seller's house get sold with the least expense in marketing and the shortest days on market.

A campaign may be inbound (responding to customer inquiries) or outbound (initiating contact with customers). A campaign has a name, start date, end date, budget, currency, and comment. A campaign may be active or suspended by CARS. Campaigns are characterized by grouping them into several types. Table 2 shows some examples of campaign types. One of more market agents may sponsor a campaign, providing authorization and assuming responsibility for its budget. Campaigns may be hierarchically structured; broad campaigns may be divided into lesser campaigns with more focused activities. The RelatedCampaign association lets us bind inbound campaigns to outbound campaigns.

Campaigns are orchestrated to achieve objectives. The first paragraph in this section illustrated several possible objectives: find leads, buy property, and sell property. Variables are manipulated to accomplish campaign objectives. The first paragraph also demonstrated several variables: cost, time, and effort.

Campaigns can involve several activities. A campaign activity is some task that consumes resources in an attempt to market services and properties and further the goals of one or more campaigns. When an activity is beneficial to multiple campaigns, its costs must be allocated for accounting purposes. Various market agents can participate in a campaign activity and assume multiple roles.

A campaign activity has a name, start date, end date, budget, currency, and comment. We also indicate if a campaign activity is for indirect purposes, such as to publicize and raise the profile of a realtor, realty firm, or some other market agent role. Campaign activities are also grouped into several types: hot line, direct mail, direct call, web site, advertising, and other. For example, the DirectCall class authorizes phone calls by customer service representatives that lead to PhoneCall events (see Section 8). A campaign activity is targeted at some region. (Section 6 discusses regions.)

campaignType
market monitor
market appraiser
aged inventory
customer status
personal promotion
direct mail
customer survey
sell valuable item
purchase valuable item Table 2. Some CampaignTypes Both campaigns and campaign activities are performed to obtain leads. A lead is a possible request for properties and/or services that The real estate broker can provide. We assign a priority to leads so that CARS can emphasize the most promising leads. When possible, we track the correspondence of leads to campaigns and campaign activities so the CARS optimizer and The real estate broker can make better business decisions. Each lead can concern multiple legal entities as prospective customers. (Recall that a legal entity is an organization or person.) Some legal entity may be the primary source for a lead.

A lead is ultimately referred to a market agent on behalf of The real estate broker. (Recall that a market agent can be an organization, person, or computer process acting as an agent.) Only one referral for a lead may be in effect at a time. Referrals can be revoked if an agent is ineffective for some reason.

Typically a lead is referred by CARS, but a customer service representative may sometimes need to override the recommendation of CARS. Referrals can also be made to affiliates, such as mortgage companies. Of course a prospect can be the subject of multiple leads and a market agent can handle multiple leads.

4. Listing and Deal

Figure 13:
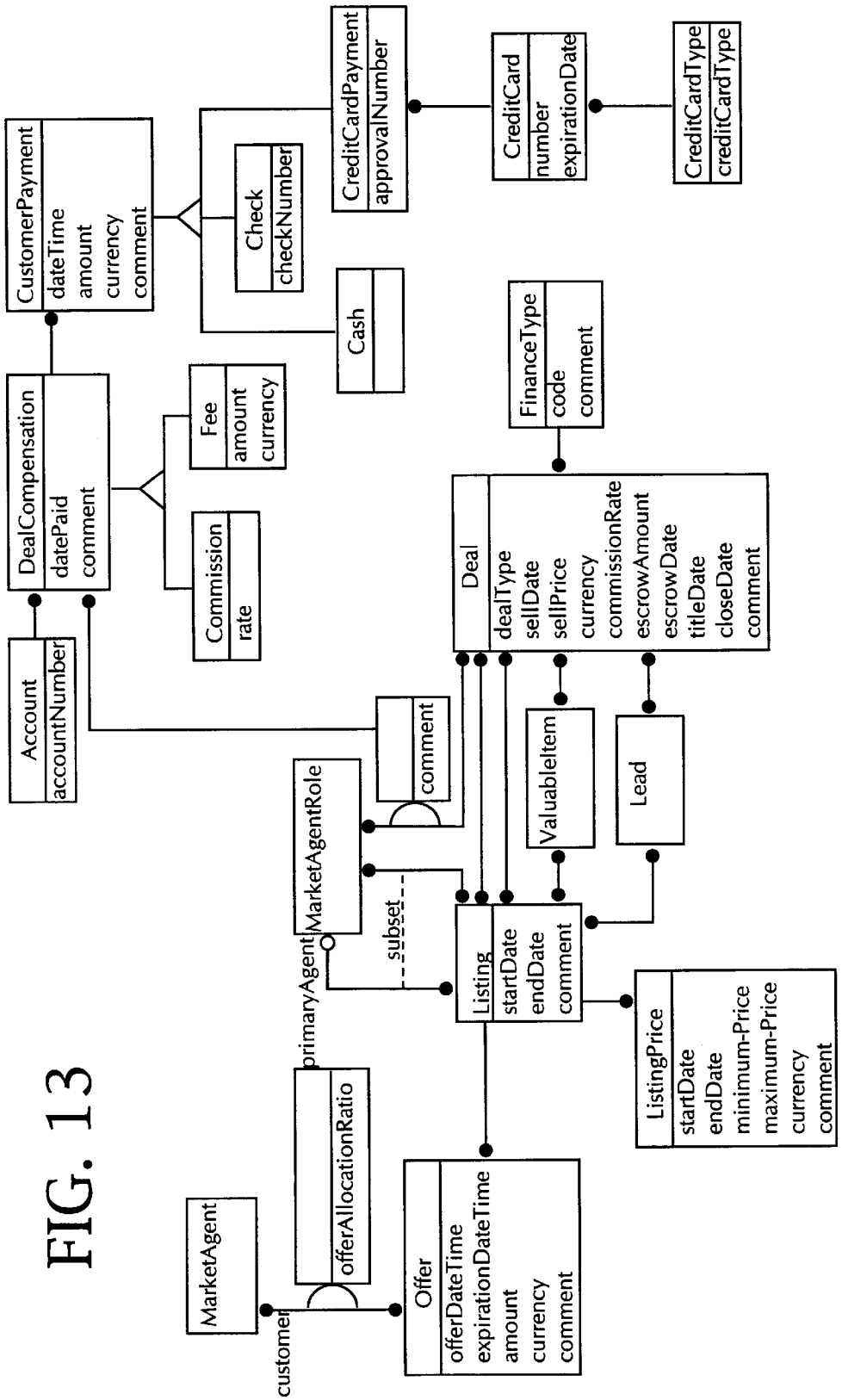
FIG. 13 is an object model for the Listing and Deal package employed by the presently preferred CARS framework.

FIG. 13 presents our object model for the listing and deal package. The purpose of campaigns is to spawn leads. The better leads ultimately turn into listings and deals. A listing is a proposition to buy or sell properties or services (typically one property or service, but it could be many). Each listing is handled by a primary agent and involves multiple market agent roles (including customers). A listing is a dynamic object and the state-event model describes its current state as well as its valid states (see Section 8). A listing may have various prices that are posted over time. We record a range for listing price because some listings are hypothetical (desires) and a range better describes what a prospect might pay than a single price.

CARS publishes listings and financial offers that are received over time. Offers may be accepted, rejected, or pending. (These are offer states; see Section 8.) For property sales listings only one offer can ultimately be accepted. However, multiple offers can be accepted for some rental property and services. Typically an offer is made by one market agent (person, company, or computer agent) but a large offer could conceivably be made by multiple market agents acting in concert.

The purpose of leads is to generate listings. Similarly, the purpose of listings is to generate deals. Occasionally a lead may directly trigger a deal, but normally the property or service (valuable item) must be formally listed and offers received before a deal can be struck. A deal is a contract between persons or organizations for properties or services. A deal also is a dynamic object and has states such as pending and closed (see Section 8). The commissions and fees for a deal are apportioned to the various market agent roles (persons and organizations that participate as realty agent, realty firm, . . . ) that contribute to a deal and posted to the appropriate financial accounts. The compensation for a deal can be via cash, check, or credit cards; the use of credit cards would facilitate electronic commerce on the web for the do-it-yourself market segment. Credit card types include Visa, Mastercharge, Discover, and American Express.

5. Address, Phone, and Email

Figure 17:
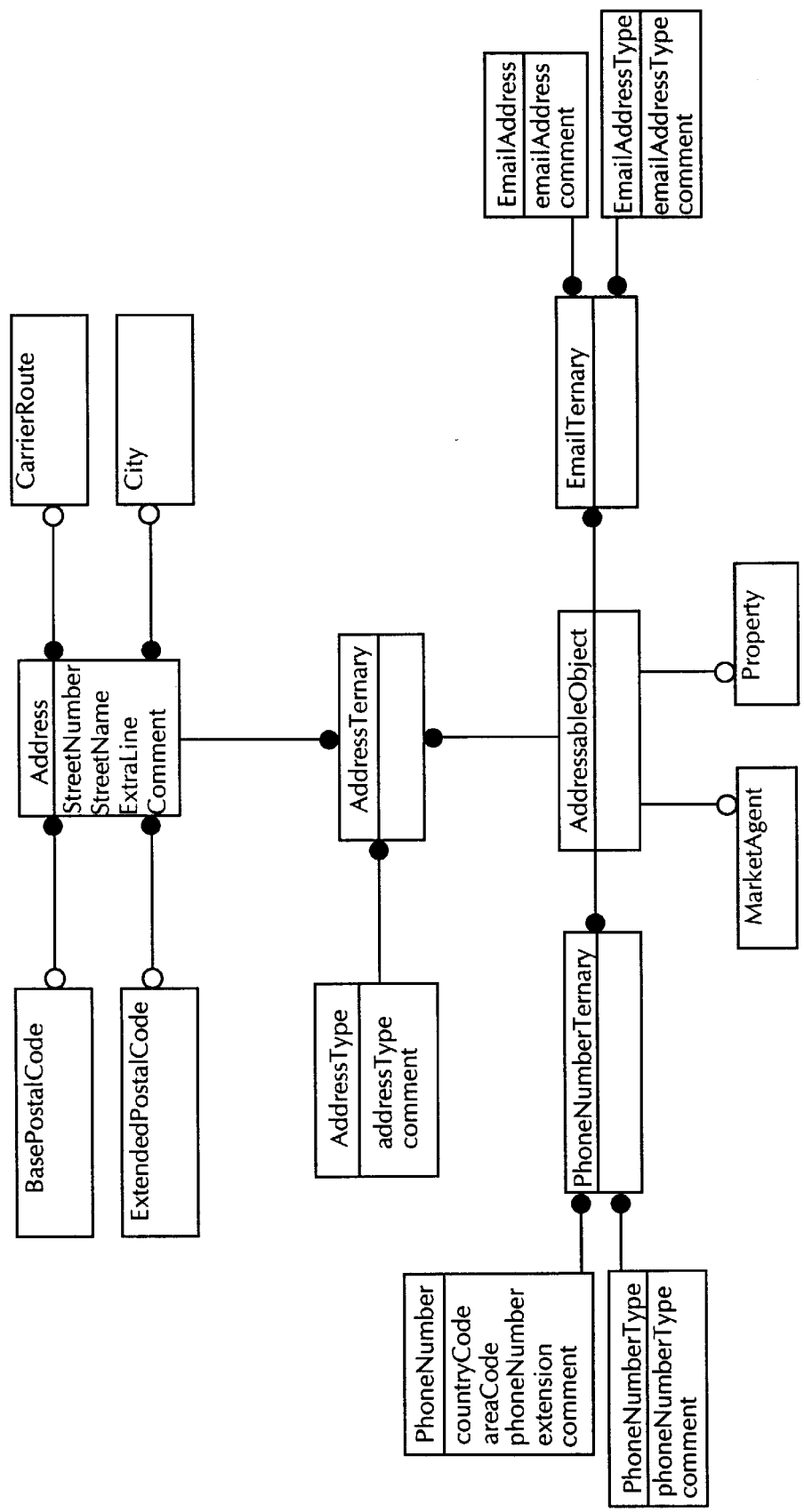
FIG. 17 is an object model for the addressable object package employed by the presently preferred CARS framework.

In FIG. 17 we flexibly handle addresses, phone numbers, and email addresses. An AddressableObject is anything that can have addresses, phone numbers, and/or email addresses. A market agent or a property can have addressable object information. An AddressableObject pertains to a MarketAgent or a Property, but not both (exclusive-or association). This constraint is not readily expressed with the object model.

In a prior iteration of this model, we generalized MarketAgent and Property into AddressableObject. We removed this generalization to avoid multiple inheritance—it is more fundamental to generalize Property into ValuableItem. We associate AddressableObject with MarketAgent instead of LegalEntity because we must handle email. In addition, it is conceivable that a computer agent might appear to be real and have a phone and address from the perspective of an interacting person.

We can store multiple addresses for an AddressableObject and assign an addressType (such as headquarters address, mailing address, physical address, home address, or office address) to each use of an address. Similarly, we also can store multiple phone numbers (such as phoneNumberTypes of office, home, cellular, pager, and fax) and multiple email addresses (such as emailAddressTypes of home and office).

The class AddressTernary denotes that we must have the three-way confluence of AddressableObject, Address, and AddressType to resolve an occurrence. This is because an AddressableObject—Address combination may have multiple AddressTypes. For example, an address for a company may be used for both the headquarters and mailing address. Similarly, the class PhoneNumberTernary denotes the three-way confluence between AddressableObject, PhoneNumber, and PhoneNumberType. The class EmailTernary denotes the three-way confluence between AddressableObject, EmailAddress, and EmailAddressType. The arrows indicate the combination of objects that are required to identify each occurrence of the ternary association. (OMT has notation for ternary associations, but the modeling tool that I used does not.)

An address may refer to postal code, carrier route, and city data from which additional address details can be deduced.

6. Geographic and Demographic Region

Figure 14:
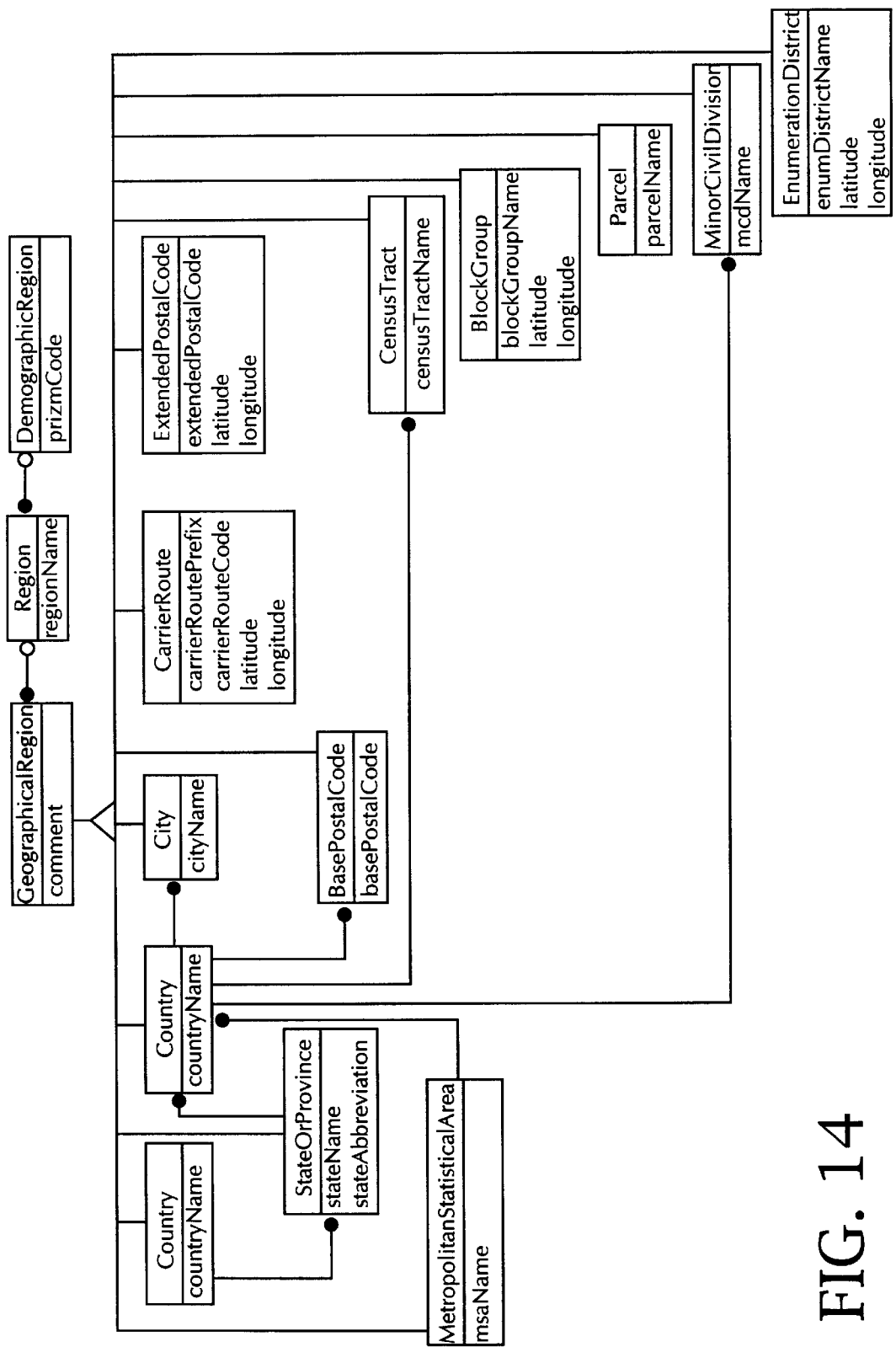
FIG. 14 is an object model for the Region package employed by the presently preferred CARS framework.

FIG. 14 defines a region as a geographic region, a demographic region, or a combination of both. FIG. 12 referenced region to specify the scope of a campaign activity.

The generalization hierarchy specifies different kinds of geographic regions. We also note dependencies between geographic information. For example, a city belongs to a county which belongs to a state or province which in turn belongs to a country. Thus in FIG. 14, if an address refers to a city, we can look up the county, state, and country data.

There are two different bases for specifying geographic regions: postal data (carrier route, base postal code, and extended postal code) and census data (metropolitan statistical area, census tract, block group, parcel, minor civil division, and enumeration district).

Currently a demographic region is determined by prizm code. However, other techniques for assessing the economic status of households could also be used.

7. Business Element

Figure 15:
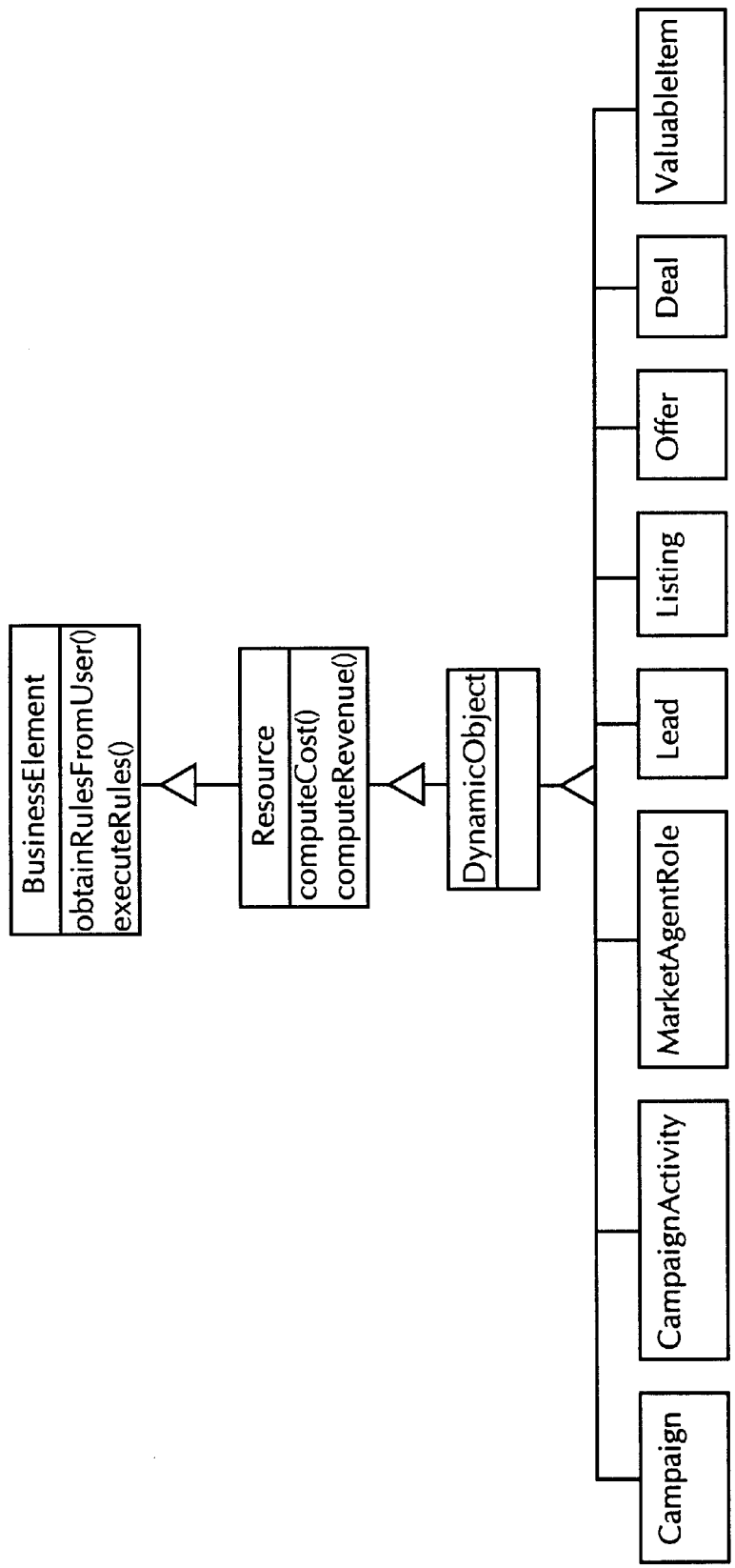
FIG. 15 is an object model for the BusinessElement package employed by the presently preferred CARS framework.

FIG. 15 shows the kind of objects that can inherit dynamic behavior. Section 8 shows the corresponding model for state-event models.

A BusinessElement can obtain rules from the user and execute those rules. A Resource inherits the capabilities of BusinessElement and can also compute its cost and revenue. We presume there are additional classes that are BusinessElements, but not Resources, though we have not determined them at this time. We record these major operations for the BusinessElement and Resource classes because they are important and not simply inferred from the object model.

Similarly, DynamicObject inherits from Resource. We presume there are additional classes that are Resources but not DynamicObjects.

8. State Model

Figure 16:
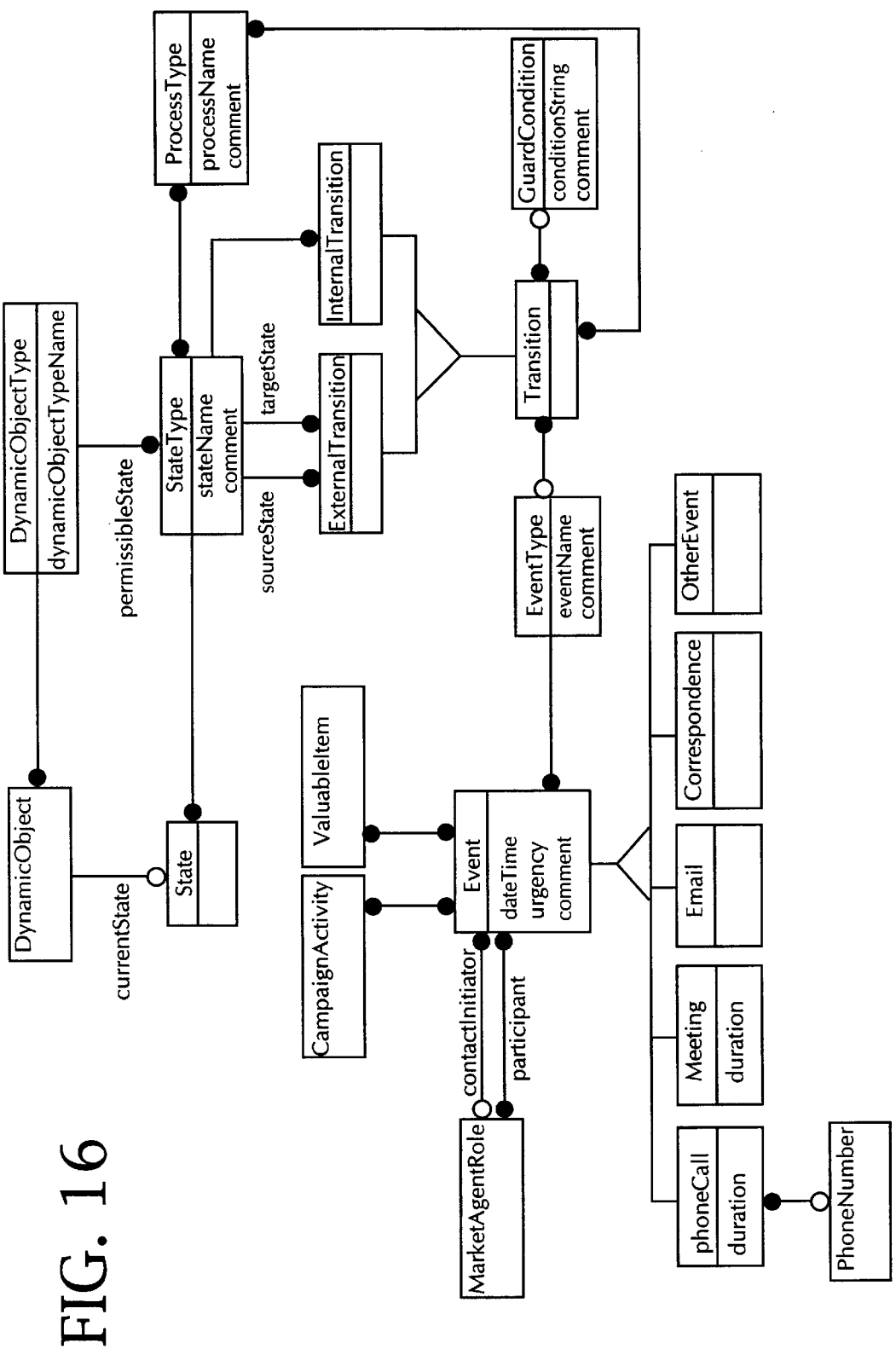
FIG. 16 is an object model for the State Model package employed by the presently preferred CARS framework.

The right side of FIG. 16 presents our state-event metamodel. Revision 1 of the CARS model had many examples of processes. It is important that we be able to handle these processes, but ideally we should not hard code them into the model's structure. The actual processes that are used in CARS will change as our understanding of the requirements mature and the business evolves. A better approach is to store process information as data so it can be more easily changed. Hence, we incorporate a state-event metamodel for process information. The CARS software could include a state-event engine to execute the processes stored in the database for the metamodel. (We recommend a state-event interpreter or precompiler.)

A StateType may have transitions entering it from another state type or transitions exiting it for another state type. Alternatively, a StateType may have a transition occur internally while remaining in the state type. Transitions may be triggered by an event type and/or a guard condition. A state may have processing that occurs for all or part of its duration, or processing may be executed in response to a transition. A DynamicObjectType has a set of permissible states which together with the defined transitions constitute a state diagram. The possible values for dynamic object type are: lead, listing, offer, deal, the values of market agent type, the values of campaign type, and the values of campaign activity type (as embodied by the generalization in FIG. 3). The left side of FIG. 8 shows individual states and events that instantiate the metamodel. State and Event, respectively, instantiate StateType and EventType in the state metamodel. A DynamicObject may have a current state.

An event is a specific occurrence and can be a phone call, a meeting, email, written correspondence, or something else. An event can involve multiple market agents (persons, organizations, or computer agents) as well as multiple valuable items (services or properties). An event may be stimulated by campaign activities. The Event class lets us record interaction with potential customers and apply the rules that are embodied in the state transition diagram.

The state model lets us specify appropriate behavior in response to the home buying readiness state (HBSR) of a prospect. Furthermore, we can track the current state of a prospect and the events that have transpired in the past. For example, the state types of satisfied, twinkle, itch, and action would be appropriate for market agent roles of potential home buyer and potential home seller.

As another example, the state model lets us capture the life cycle for a house (vacant lot, improved, under construction, vacant house, occupied house, . . . ).

Appendix A. Sample Queries (Some Use Cases)

Here are some of the queries that the model (and the resulting database implementation) can answer.

We are recording these queries for several purposes: (1) to reduce oversights when constructing the model, (2) to show how the model can answer business questions, and (3) to facilitate implementation.

How much of the budget of a campaign is consumed by campaign activities?

How is a campaign budget apportioned to various zip codes?

Are any current offers pending for a property?

What are the top 10 accounts for fiscal year 1997?

What value of offers was made in the past month for all properties and services?

What percentage of offers were accepted in the past month for all properties?

What realty agents had the lowest percentage of their offers accepted in the past month?

What is the current listing price for a property?

What is the average ratio of sell price to listing price for deals concluded in the past year?

What deals can be attributed to a given campaign?

Find all properties that do not have an offer.

What is the home address and phone number for John Doe?

What information does The real estate broker have for Jane Smith?

Compute the average cost per lead (prorate the cost of the campaign that is its primary source).

What was The real estate broker's market share for deals in a given zip code in a given year? (We can only answer this query if non-The real estate broker deals are entered in the database.)

What was the average margin for deals in a given zip code in a given year?

What customers have provided The real estate broker with repeat business in the last year?

Find all properties listed in a city within a specified price range.

What percentage of leads became listings in a time interval for a region and realty firm?

What percentage of leads became deals in a time interval for a region and realty firm?

What percentage of listings became deals in a time interval for a region and realty firm?

How many days has a property been on the market?

Find the hot line callers that a customer service representative (CSR) called back.

Rate prospects for CSRs to call per outbound campaign rules.

Appendix B. Brief Explanation of the Data Modeling Notation

Figure 18:
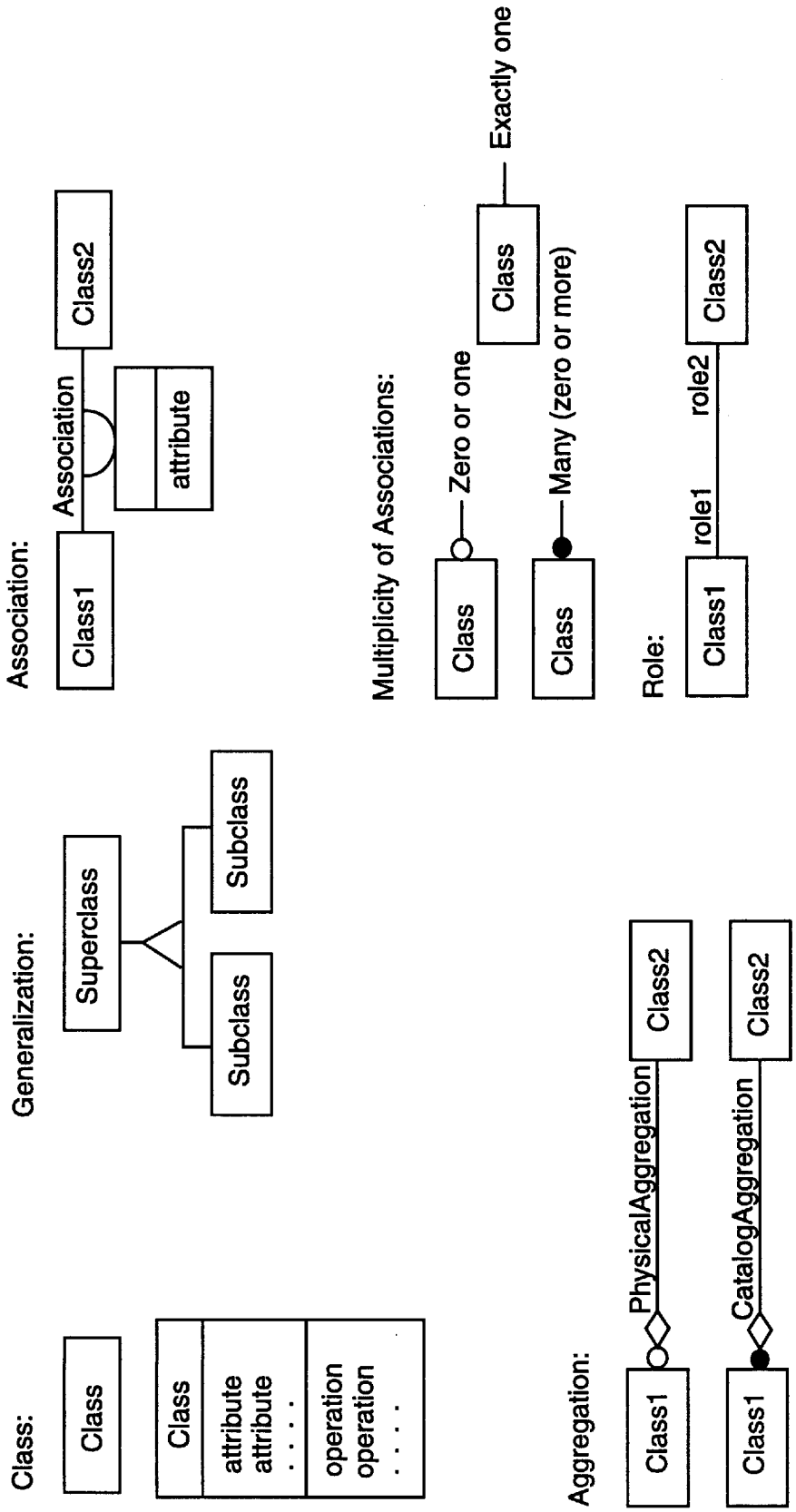
FIG. 18 presents a summary explanation of the OMT object modeling notation used in some of the figures.

FIGS. 10 through 17 use the OMT object modeling notation which is a popular enhancement of the Entity-Relationship approach. FIG. 18 summarizes modeling constructs that are encountered in this data model.

A class is denoted by a rectangle and describes objects with common attributes, behavior, and semantic intent. Campaign, Person, and Deal are examples of classes. Attributes describes values of the objects in a class and may be listed in the second portion of the class box. For example, campaignName, inboundOrOutbound, activeOrSuspended, startDate, endDate, budget, currency, and comment are attributes of class Campaign. Operations are behavior that an object can perform and are listed in the third portion of a class box.

Generalization organizes classes by their similarities and differences and is denoted by a triangle. In FIG. 10 a LegalEntity can be an Organization or a Person. Simple generalization apportions superclass instances (LegalEntity) among the subclasses (Organization, Person). FIG. 10 states that a LegalEntity must be one of these two possibilities and that there are no other possibilities.

An association describes the relationship of objects of two or more classes and is indicated by a line. The adornment on each end of an association line denotes multiplicity. Multiplicity specifies how many instances of one class may relate to an instance of an associated class. A solid ball means 'many' (zero or more); a hollow ball means 'zero or one'; a line without a multiplicity symbol means exactly one. In FIG. 12 a Referral may be assigned to a MarketAgent; a MarketAgent may be responsible for several Referrals.

An association may be described by attributes that do not belong to the related classes. In FIG. 12 a Campaign may have multiple CampaignActivities and a CampaignActivity may benefit multiple Campaigns. For each CampaignActivity we must allocate the portion of its budget charged to each Campaign.

A role is one end of an association and may also be named. A role is written next to the intersection of the class box and association line. In FIG. 12 there are two associations between LegalEntity and Lead. In one, LegalEntity has a role of primarySource and in the other has a role of prospect.

Aggregation is a special kind of association and is denoted by a diamond on the aggregate end. In FIG. 10 an organization may be composed of lesser sub-organizations. The diamond end of the aggregation relationship denotes the master organization and the other end denotes the lesser organizations.

Conclusion

From the foregoing it will be appreciated that the present invention provides a sophisticated computer-implemented business management system. The system has been described both in general terms and with respect to a specific embodiment useful in real estate marketing.

While the invention has been described in its presently preferred forms, it will be understood that the invention is capable of certain modification and that the concepts disclosed herein can be embodied in a variety of different ways without departing from the spirit of the invention as set forth in the appended claims.

We claim:

1. A computer-implemented self-optimizing marketing system comprising:

a campaign engine for selectively generating and storing a campaign population, said campaign population having members comprising stored first data representing a plurality of marketing campaigns each campaign characterized by a plurality of campaign attributes including a plurality of campaign activities;

said campaign engine having processing functionality to assemble campaign population members from said campaign activities;

a customer population data store for storing a customer population, said customer population having members comprising stored second data representing a plurality of customers and potential customers, characterized by a plurality of customer attributes; and an optimization engine for accessing said first and second data to optimize at least one of said campaign population and said customer population, said optimization engine including a scoring system for ordering the members of at least one of said campaign population and said customer population, said scoring system employing adaptive scoring process that alters said scoring process based upon relations among at least some of said campaign attributes and said customer attributes.

2. The system of claim 1 further comprising an agent population data store for storing an agent population, said agent population having members comprising stored third data representing a plurality of agents each agent characterized by a plurality of agent attributes, and wherein said scoring system orders the members of said agent population based upon relations among at least some of said customer attributes and said agent attributes.

3. The system of claim 1 wherein said optimization engine employs genetic algorithm.

4. The system of claim 1 wherein said campaign engine includes prediction engine and optimization engine.

5. A computer-implemented marketing system comprising:

a state-event engine which manages behavior over time of a plurality of dynamic objects in response to events in deterministic fashion from user-supplied rules, wherein said dynamic objects include:
- a campaign engine for selectively generating and storing a campaign population, said campaign population having members comprising stored first data representing a plurality of marketing campaigns;
- said campaign engine storing campaign activities data and having processing functionality to assemble campaign population members from said campaign activities;
- a listing population data store for storing a listing population of offers to buy and sell resource items, said listing population having members comprising stored second data representing resource items having associated offers to buy or sell;
- a matching process for ordering the members of said listing population based on members of said campaign population such that a set of both offers to buy and offers to sell the same resource item is created.

6. The system of claim 5 wherein said dynamic objects further include: a marketing agent population data store for storing a population of marketing agents associated with at least one of said resource items.

7. The system of claim 6 wherein said population of marketing agents includes at least one software agent.

8. The system of claim 6 wherein said population of marketing agents has members comprising stored third data representing marketing agent types and marketing agent attributes.

9. The system of claim 5 wherein said dynamic objects further include:
- a resource population data store for storing a population of resource items comprising fourth data representing resource item types and resource item attributes.

10. The system of claim 5 wherein said resource items are selected from the group consisting of real estate properties, goods and services.

11. The system of claim 9 wherein said resource item attributes include cost of an associated resource.

12. The system of claim 5 wherein at least one of said dynamic objects has an interface for interaction via a computer network.

13. The system of claim 5 further comprising scoring process mechanism for creating a uniform measure of value for applying to said resource items.

14. The system of claim 5 further comprising scoring process mechanism for creating a uniform measure of value for applying to said resource items based on rules specified by users identified from said listing population and said campaign population.

15. The system of claim 5 further comprising scoring process mechanism for creating a uniform measure of value for applying to said resource items based on a weighted combination of rule-based values and predicted values.

16. The system of claim 5 further comprising prediction engine that accesses said listing population data store and includes an historical database of previous actual and predicted resource listing values.

17. The system of claim 5 further comprising prediction engine that generates individual predictions with an associated confidence measure whereby individual predictions are weighted.

18. The system of claim 5 further comprising optimization engine that implements an automated exchange process between offers to sell and offers to buy.

19. The system of claim 18 wherein said exchange process is based on user-specified rules extracted from said first data.

20. The system of claim 18 wherein said exchange process is based on user-specified rules comprising a specificity score representing the degree of match between a first resource item attribute set corresponding to the buyer and a second resource item attribute set corresponding to the seller.

21. The system of claim 18 wherein said exchange process is based on user-specified rules comprising a specificity score representing an importance weight.

22. The system of claim 5 further comprising optimization engine that sequentially and iteratively orchestrates the manner of bid offerings and bid acceptance in an exchange process between offers to sell and offers to buy.

23. The system of claim 22 wherein said exchange process seeks the best possible bid for each resource item using a predefined rule set provided by a sponsor of the a campaign.

24. The system of claim 5 further comprising a prediction engine having an historical pattern data store and a means for automatically obtaining data to about consummated exchanges between buyer and seller to for updating said historical pattern data store.

25. The system of claim 24 wherein said prediction engine includes a scoring process that adjusts the weight given to predicted values to reflect increased confidence over time as the system is used.

26. A computer-implemented real estate marketing system to facilitate transactions among real estate agents, at least one real estate broker and members of the public, comprising:
- a campaign engine for selectively generating a plurality of marketing campaigns each characterized by a plurality of campaign attributes, said campaign engine having processing functionality to assemble said marketing campaigns from a set of stored activities;
- at least one data structure for access by said campaign engine for the storing and retrieving of:
  (a) said campaign attributes,
  (b) rules representing user-defined objectives of the marketing system,
  (c) customer attributes reflecting the readiness and desires of selected members of the public with respect to real estate, and
  (d) leads corresponding to selected members of the public;
- said campaign engine having an agent interface by which said real estate agents may specify and store rules to be reflected in at least one marketing campaign and by which said real estate agents may retrieve leads representing selected members of the public;
- said campaign engine having a broker interface by which said real estate broker may specify and store rules to be reflected in at least one marketing campaign and by which selected ones of said stored campaign attributes may be retrieved and communicated to said broker;
- said campaign engine having a customer interface for the input and storing of customer attributes;
- said campaign engine having a prediction engine that accesses said data structure to predict, based on said customer attributes, how said campaign attributes and leads may be modified to improve conformance to said rules and to predict which selected members of the public are most likely to engage in real estate transactions, thereby making marketing campaigns more attractive to members of the public and generating leads for said real estate agents.

27. A computer-implemented self-optimizing marketing system comprising:

a campaign engine for selectively generating and storing a campaign population on behalf of a campaign sponsor, said campaign population having members comprising stored first data representing a plurality of marketing campaigns each campaign characterized by a plurality of campaign attributes, including attributes reflecting available resources and the costs associated with those resources;

said campaign engine having an interface for input of the campaign sponsor's desires with respect to a campaign; said campaign engine further having processing functionality that seeks to marshal said available resources to maximize the campaign sponsor's desires being met while minimizing the cost to do so;

a customer population data store for storing a customer population, said customer population having members comprising stored second data representing a plurality of customers and potential customers, characterized by a plurality of customer attributes; and an optimization engine for accessing said first and second data to optimize at least one of said campaign population and said customer population, said optimization engine including a scoring system for ordering the members of at least one of said campaign population and said customer population, said scoring system employing adaptive scoring process that alters said scoring process based upon relations among at least some of said campaign attributes and said customer attributes.

28. The system of claim 27 further comprising an agent population data store for storing an agent population, said agent population having members comprising stored third data representing a plurality of agents each agent characterized by a plurality of agent attributes, and wherein said scoring system orders the members of said agent population based upon relations among at least some of said customer attributes and said agent attributes.

29. The system of claim 27 wherein said optimization engine employs genetic algorithm.

30. The system of claim 27 wherein said campaign engine includes prediction engine and optimization engine.

31. A computer-implemented marketing system comprising:

a state-event engine which manages behavior over time of a plurality of dynamic objects in response to events in deterministic fashion from user-supplied rules, wherein said dynamic objects include:

a campaign engine for selectively generating and storing a campaign population, said campaign population having members comprising stored first data representing a plurality of marketing campaigns, said first data including data reflecting available resources and the costs associated with those resources;

said campaign engine having an interface for input of the campaign sponsor's desires with respect to a campaign;

said campaign engine further having processing functionality that seeks to marshal said available resources to maximize the campaign sponsor's desires being met while minimizing the cost to do so;

a listing population data store for storing a listing population of offers to buy and sell resource items, said listing population having members comprising stored second data representing resource items having associated offers to buy or sell;

a matching process for ordering the members of said listing population based on members of said campaign population such that a set of both offers to buy and offers to sell the same resource item is created.

32. The system of claim 31 wherein said dynamic objects further include:

a marketing agent population data store for storing a population of marketing agents associated with at least one of said resource items.

33. The system of claim 32 wherein said population of marketing agents includes at least one software agent.

34. The system of claim 32 wherein said population of marketing agents has members comprising stored third data representing marketing agent types and marketing agent attributes.

35. The system of claim 31 wherein said dynamic objects further include:

a resource population data store for storing a population of resource items comprising fourth data representing resource item types and resource item attributes.

36. The system of claim 31 wherein said resource items are selected from the group consisting of real estate properties, goods and services.

37. The system of claim 35 wherein said resource item attributes include cost of an associated resource.

38. The system of claim 31 wherein at least one of said dynamic objects has an interface for interaction via a computer network.

39. The system of claim 31 further comprising scoring process mechanism for creating a uniform measure of value for applying to said resource items.

40. The system of claim 31 further comprising scoring process mechanism for creating a uniform measure of value for applying to said resource items based on rules specified by users identified from said listing population and said campaign population.

41. The system of claim 31 further comprising scoring process mechanism for creating a uniform measure of value for applying to said resource items based on a weighted combination of rule-based values and predicted values.

42. The system of claim 31 further comprising prediction engine that accesses said listing population data store and includes an historical database of previous actual and predicted resource listing values.

43. The system of claim 31 further comprising prediction engine that generates individual predictions with an associated confidence measure whereby individual predictions are weighted.

44. The system of claim 31 further comprising optimization engine that implements an automated exchange process between offers to sell and offers to buy.

45. The system of claim 44 wherein said exchange process is based on user-specified rules extracted from said first data.

46. The system of claim 44 wherein said exchange process is based on user-specified rules comprising a specificity score representing the degree of match between a first resource item attribute set corresponding to the buyer and a second resource item attribute set corresponding to the seller.

47. A computer-implemented self-optimizing marketing system comprising:

a campaign engine for selectively generating and storing a campaign population, said campaign population having members comprising stored first data representing a plurality of marketing campaigns each campaign characterized by a plurality of campaign attributes;

a customer population data store for storing a customer population, said customer population having members comprising stored second data representing a plurality of customers and potential customers, characterized by a plurality of customer attributes;

an optimization engine for accessing said first and second data to optimize at least one of said campaign population and said customer population, said optimization engine including a scoring system for ordering the members of at least one of said campaign population and said customer population, said scoring system employing adaptive scoring process that alters said scoring process based upon relations among at least some of said campaign attributes and said customer attributes; and an agent population data store for storing an agent population, said agent population having members comprising stored third data representing a plurality of agents each agent characterized by a plurality of agent attributes, wherein said scoring system orders the members of said agent population based upon relations among at least some of said customer attributes and said agent attributes.

48. A computer-implemented marketing system comprising:

a state-event engine which manages behavior over time of a plurality of dynamic objects in response to events in deterministic fashion from user-supplied rules, wherein said dynamic objects include:

a campaign engine for selectively generating and storing a campaign population, said campaign population having members comprising stored first data representing a plurality of marketing campaigns;

a listing population data store for storing a listing population of offers to buy and sell resource items, said listing population having members comprising stored second data representing resource items having associated offers to buy or sell;

a matching process for ordering the members of said listing population based on members of said campaign population such that a set of both offers to buy and offers to sell the same resource item is created; and a scoring process mechanism for creating a uniform measure of value for applying to said resource items.

49. The system of claim 48 wherein said scoring process mechanism for creating a uniform measure of value for applying to said resource items based on rules specified by users identified from said listing population and said campaign population.

50. The system of claim 48 wherein said scoring process mechanism for creating a uniform measure of value for applying to said resource items based on a weighted combination of rule-based values and predicted values.

51. The system of claim 48 further comprising optimization engine that implements an automated exchange process between offers to sell and offers to buy wherein said exchange process is based on user-specified rules comprising a specificity score representing the degree of match between a first resource item attribute set corresponding to the buyer and a second resource item attribute set corresponding to the seller.

52. The system of claim 48 further comprising optimization engine that implements an automated exchange process between offers to sell and offers to buy wherein said exchange process is based on user-specified rules comprising a specificity score representing an importance weight.

53. The system of claim 48 further comprising a prediction engine having an historical pattern data store and a means for automatically obtaining data to about consummated exchanges between buyer and seller to for updating said historical pattern data store and wherein said prediction engine includes a scoring process that adjusts the weight given to predicted values to reflect increased confidence over time as the system is used.

* * * * *